(12) United States Patent
Guendelman et al.

(10) Patent No.: US 11,169,611 B2
(45) Date of Patent: Nov. 9, 2021

(54) ENHANCED VIRTUAL TOUCHPAD

(71) Applicant: PRIMESENSE LTD., Tel Aviv (IL)

(72) Inventors: Eran Guendelman, Tel Aviv (IL); Ofir Or, Ramat Gan (IL); Eyal Bychkov, Hod Hasharon (IL); Oren Brezner, Rishon Lezion (IL); Adi Berenson, Beit Hashmonay (IL)

(73) Assignee: APPLE INC., Cupertino, CA (US)

( * ) Notice: Subject to any disclaimer, the term of this patent is extended or adjusted under 35 U.S.C. 154(b) by 2375 days.

(21) Appl. No.: 13/849,517

(22) Filed: Mar. 24, 2013

(65) Prior Publication Data

US 2013/0283213 A1    Oct. 24, 2013

Related U.S. Application Data

(60) Provisional application No. 61/615,403, filed on Mar. 26, 2012, provisional application No. 61/663,638, filed on Jun. 25, 2012.

(51) Int. Cl.
*G06F 3/01* (2006.01)
*G06F 3/042* (2006.01)
(Continued)

(52) U.S. Cl.
CPC .............. *G06F 3/017* (2013.01); *G06F 3/013* (2013.01); *G06F 3/0425* (2013.01); (Continued)

(58) Field of Classification Search
CPC .............. G02B 27/2292; G06F 3/0346; G06F 3/0325; G06F 3/04886; G06F 3/017
See application file for complete search history.

(56) References Cited

U.S. PATENT DOCUMENTS 4,550,250 A    10/1985 Mueller et al.
4,789,921 A    12/1988 Aho
(Continued)

FOREIGN PATENT DOCUMENTS

CN    102306053 A    1/2012
WO    199935633 A1    7/1999
(Continued)

OTHER PUBLICATIONS

Microsoft HoloDesk lets Users Handle Virtual 3D objects as published at http://www.gizmag.com/holodesk-lets-users-handle-virtual-3d-objects/20257/ Oct. 24, 2011 by Paul Ridden (HoloDesk).*
(Continued)

*Primary Examiner* — William L Bashore
*Assistant Examiner* — Nathan K Shrewsbury
(74) *Attorney, Agent, or Firm* — Kligler & Associates Patent Attorneys Ltd

(57) ABSTRACT

A method, including receiving, by a computer, a two-dimensional image (2D) containing at least a physical surface and segmenting the physical surface into one or more physical regions. A functionality is assigned to each of the one or more physical regions, each of the functionalities corresponding to a tactile input device, and a sequence of three-dimensional (3D) maps is received, the sequence of 3D maps containing at least a hand of a user of the computer, the hand positioned on one of the physical regions. The 3D maps are analyzed to detect a gesture performed by the user, and based on the gesture, an input is simulated for the tactile input device corresponding to the one of the physical regions.

12 Claims, 12 Drawing Sheets

(51) Int. Cl.
    *G06F 3/0485*      (2013.01)
    *G06F 3/0486*      (2013.01)
    *G06F 3/0484*      (2013.01)
    *G06F 3/0488*      (2013.01)

(52) U.S. Cl.
    CPC .......... *G06F 3/0485* (2013.01); *G06F 3/0486* (2013.01); *G06F 3/0488* (2013.01); *G06F 3/04842* (2013.01); *G06F 2203/04806* (2013.01)

(56) References Cited

U.S. PATENT DOCUMENTS

| | | | |
|---|---|---|---|
| 4,836,670 A | 6/1989 | Hutchinson | |
| 4,988,981 A | 1/1991 | Zimmerman et al. | |
| 5,434,370 A * | 7/1995 | Wilson et al. | 178/19.01 |
| 5,454,043 A | 9/1995 | Freeman | |
| 5,495,576 A | 2/1996 | Ritchey | |
| 5,588,139 A | 12/1996 | Lanier et al. | |
| 5,594,469 A | 1/1997 | Freeman et al. | |
| 5,805,167 A | 9/1998 | Van Cruyningen | |
| 5,846,134 A | 12/1998 | Latypov | |
| 5,852,672 A | 12/1998 | Lu | |
| 5,862,256 A | 1/1999 | Zetts et al. | |
| 5,864,635 A | 1/1999 | Zetts et al. | |
| 5,870,196 A | 2/1999 | Lulli et al. | |
| 5,917,937 A | 6/1999 | Szeliski et al. | |
| 5,973,700 A | 10/1999 | Taylor et al. | |
| 6,002,808 A | 12/1999 | Freeman | |
| 6,084,979 A | 7/2000 | Kanade et al. | |
| 6,211,848 B1 * | 4/2001 | Plesniak | G06F 3/016 345/156 |
| 6,243,054 B1 | 6/2001 | Deluca | |
| 6,246,779 B1 | 6/2001 | Fukui et al. | |
| 6,252,988 B1 | 6/2001 | Ho | |
| 6,256,033 B1 | 7/2001 | Nguyen | |
| 6,262,740 B1 | 7/2001 | Lauer et al. | |
| 6,345,111 B1 | 2/2002 | Yamaguchi et al. | |
| 6,345,893 B2 | 2/2002 | Fateh et al. | |
| 6,452,584 B1 | 9/2002 | Walker et al. | |
| 6,456,262 B1 | 9/2002 | Bell | |
| 6,483,499 B1 * | 11/2002 | Li et al. | 345/179 |
| 6,507,353 B1 | 1/2003 | Huard et al. | |
| 6,512,838 B1 | 1/2003 | Rafii et al. | |
| 6,519,363 B1 | 2/2003 | Su et al. | |
| 6,559,813 B1 | 5/2003 | Deluca et al. | |
| 6,681,031 B2 | 1/2004 | Cohen et al. | |
| 6,686,921 B1 | 2/2004 | Rushmeier | |
| 6,690,370 B2 | 2/2004 | Ellenby et al. | |
| 6,741,251 B2 | 5/2004 | Malzbender | |
| 6,791,540 B1 | 9/2004 | Baumberg | |
| 6,803,928 B2 | 10/2004 | Bimber et al. | |
| 6,853,935 B2 | 2/2005 | Satoh et al. | |
| 6,857,746 B2 | 2/2005 | Dyner | |
| 6,977,654 B2 | 12/2005 | Malik et al. | |
| 7,003,134 B1 | 2/2006 | Covell et al. | |
| 7,013,046 B2 | 3/2006 | Kawamura et al. | |
| 7,023,436 B2 | 4/2006 | Segawa et al. | |
| 7,042,440 B2 | 5/2006 | Pryor et al. | |
| 7,042,442 B1 | 5/2006 | Kanevsky et al. | |
| 7,151,530 B2 | 12/2006 | Roeber et al. | |
| 7,170,492 B2 | 1/2007 | Bell | |
| 7,215,815 B2 | 5/2007 | Honda | |
| 7,227,526 B2 | 6/2007 | Hildreth et al. | |
| 7,259,747 B2 | 8/2007 | Bell | |
| 7,264,554 B2 | 9/2007 | Bentley | |
| 7,289,227 B2 | 10/2007 | Smetak et al. | |
| 7,301,648 B2 | 11/2007 | Foxlin | |
| 7,302,099 B2 | 11/2007 | Zhang et al. | |
| 7,312,786 B2 * | 12/2007 | Anderson | G06F 3/04845 345/156 |
| 7,333,113 B2 | 2/2008 | Gordon | |
| 7,340,077 B2 | 3/2008 | Gokturk | |
| 7,348,963 B2 | 3/2008 | Bell | |
| 7,358,972 B2 | 4/2008 | Gordon et al. | |
| 7,370,883 B2 | 5/2008 | Basir et al. | |
| 7,427,996 B2 | 9/2008 | Yonezawa et al. | |
| 7,428,542 B1 | 9/2008 | Fink et al. | |
| 7,474,256 B2 | 1/2009 | Ohta et al. | |
| 7,526,120 B2 | 4/2009 | Gokturk et al. | |
| 7,536,032 B2 | 5/2009 | Bell | |
| 7,573,480 B2 | 8/2009 | Gordon | |
| 7,576,727 B2 | 8/2009 | Bell | |
| 7,580,572 B2 | 8/2009 | Bang et al. | |
| 7,590,941 B2 | 9/2009 | Wee et al. | |
| 7,688,998 B2 | 3/2010 | Tuma et al. | |
| 7,696,876 B2 | 4/2010 | Dimmer et al. | |
| 7,724,250 B2 | 5/2010 | Ishii et al. | |
| 7,762,665 B2 | 7/2010 | Vertegaal et al. | |
| 7,774,155 B2 | 8/2010 | Sato et al. | |
| 7,809,160 B2 | 10/2010 | Vertegaal et al. | |
| 7,812,842 B2 | 10/2010 | Gordon | |
| 7,821,541 B2 | 10/2010 | Delean | |
| 7,840,031 B2 | 11/2010 | Albertson et al. | |
| 7,844,914 B2 | 11/2010 | Andre et al. | |
| 7,925,549 B2 | 4/2011 | Looney et al. | |
| 7,971,156 B2 | 6/2011 | Albertson et al. | |
| 8,149,210 B2 | 4/2012 | Klier et al. | |
| 8,150,142 B2 | 4/2012 | Freedman et al. | |
| 8,166,421 B2 | 4/2012 | Magal et al. | |
| 8,249,334 B2 | 8/2012 | Berliner et al. | |
| 8,368,647 B2 | 2/2013 | Lin | |
| 8,390,821 B2 | 3/2013 | Shpunt et al. | |
| 8,400,494 B2 | 3/2013 | Zalevsky et al. | |
| 8,493,496 B2 | 7/2013 | Freedman et al. | |
| 8,514,221 B2 | 8/2013 | King et al. | |
| 8,565,479 B2 | 10/2013 | Gurman et al. | |
| 8,959,013 B2 * | 2/2015 | Galor | G06F 40/274 704/9 |
| 2002/0057383 A1 | 5/2002 | Iwamura | |
| 2002/0071607 A1 | 6/2002 | Kawamura et al. | |
| 2002/0158873 A1 | 10/2002 | Williamson | |
| 2003/0057972 A1 | 3/2003 | Pfaff et al. | |
| 2003/0063775 A1 | 4/2003 | Rafii et al. | |
| 2003/0088463 A1 | 5/2003 | Kanevsky | |
| 2003/0146901 A1 | 8/2003 | Ryan | |
| 2003/0156756 A1 | 8/2003 | Gokturk et al. | |
| 2003/0185444 A1 | 10/2003 | Honda | |
| 2003/0234346 A1 | 12/2003 | Kao | |
| 2003/0235341 A1 | 12/2003 | Gokturk et al. | |
| 2004/0046744 A1 | 3/2004 | Rafii et al. | |
| 2004/0104935 A1 | 6/2004 | Williamson | |
| 2004/0135744 A1 | 7/2004 | Bimber et al. | |
| 2004/0165099 A1 | 8/2004 | Stavely et al. | |
| 2004/0174770 A1 | 9/2004 | Rees | |
| 2004/0183775 A1 | 9/2004 | Bell | |
| 2004/0184640 A1 | 9/2004 | Bang et al. | |
| 2004/0184659 A1 | 9/2004 | Bang et al. | |
| 2004/0193413 A1 | 9/2004 | Wilson et al. | |
| 2004/0258314 A1 * | 12/2004 | Hashimoto | G06F 3/0325 382/224 |
| 2005/0031166 A1 | 2/2005 | Fujimara et al. | |
| 2005/0062684 A1 * | 3/2005 | Geng | 345/32 |
| 2005/0088407 A1 | 4/2005 | Bell et al. | |
| 2005/0089194 A1 | 4/2005 | Bell | |
| 2005/0110964 A1 | 5/2005 | Bell et al. | |
| 2005/0122308 A1 | 6/2005 | Bell et al. | |
| 2005/0162381 A1 | 7/2005 | Bell et al. | |
| 2005/0190972 A1 | 9/2005 | Thomas et al. | |
| 2005/0254726 A1 | 11/2005 | Fuchs et al. | |
| 2005/0265583 A1 | 12/2005 | Covell et al. | |
| 2006/0010400 A1 | 1/2006 | Dehlin et al. | |
| 2006/0092138 A1 | 5/2006 | Kim et al. | |
| 2006/0110008 A1 | 5/2006 | Vertegaal et al. | |
| 2006/0115155 A1 | 6/2006 | Lui et al. | |
| 2006/0139314 A1 | 6/2006 | Bell | |
| 2006/0149737 A1 | 7/2006 | Du et al. | |
| 2006/0159344 A1 | 7/2006 | Shao et al. | |
| 2006/0187196 A1 | 8/2006 | Underkoffler et al. | |
| 2006/0239670 A1 | 10/2006 | Cleveland | |
| 2006/0248475 A1 | 11/2006 | Abrahamsson | |
| 2007/0060336 A1 | 3/2007 | Marks et al. | |
| 2007/0078552 A1 | 4/2007 | Rosenberg | |
| 2007/0154116 A1 | 7/2007 | Shieh | |

(56) References Cited

U.S. PATENT DOCUMENTS

| | | |
|---|---|---|
| 2007/0230789 A1 | 10/2007 | Chang et al. |
| 2008/0019589 A1 | 1/2008 | Yoon et al. |
| 2008/0062123 A1 | 3/2008 | Bell |
| 2008/0094371 A1 | 4/2008 | Forstall et al. |
| 2008/0123940 A1 | 5/2008 | Kundu et al. |
| 2008/0150890 A1 | 6/2008 | Bell et al. |
| 2008/0150913 A1 | 6/2008 | Bell et al. |
| 2008/0170776 A1 | 7/2008 | Albertson et al. |
| 2008/0231926 A1 | 9/2008 | Klug et al. |
| 2008/0236902 A1 | 10/2008 | Imaizumi |
| 2008/0244468 A1 | 10/2008 | Nishihara et al. |
| 2008/0252596 A1 | 10/2008 | Bell et al. |
| 2008/0256494 A1 | 10/2008 | Greenfield |
| 2008/0260250 A1 | 10/2008 | Vardi |
| 2008/0273755 A1 | 11/2008 | Hildreth |
| 2008/0278462 A1 | 11/2008 | Chang |
| 2008/0287189 A1 | 11/2008 | Rabin |
| 2009/0009593 A1 | 1/2009 | Cameron et al. |
| 2009/0027335 A1 | 1/2009 | Ye |
| 2009/0027337 A1 | 1/2009 | Hildreth |
| 2009/0031240 A1 | 1/2009 | Hildreth |
| 2009/0040215 A1 | 2/2009 | Afzulpurkar et al. |
| 2009/0077504 A1 | 3/2009 | Bell |
| 2009/0078473 A1 | 3/2009 | Overgard et al. |
| 2009/0083122 A1 | 3/2009 | Angell et al. |
| 2009/0083622 A1 | 3/2009 | Chien et al. |
| 2009/0096783 A1 | 4/2009 | Shpunt et al. |
| 2009/0103780 A1 | 4/2009 | Nishihara et al. |
| 2009/0153468 A1* | 6/2009 | Ong ............... G06F 3/011 345/156 |
| 2009/0183125 A1 | 7/2009 | Magal et al. |
| 2009/0195392 A1 | 8/2009 | Zalewski |
| 2009/0228841 A1 | 9/2009 | Hildreth |
| 2009/0256817 A1 | 10/2009 | Perlin et al. |
| 2009/0284608 A1 | 11/2009 | Hong et al. |
| 2009/0297028 A1 | 12/2009 | De Haan |
| 2010/0002936 A1 | 1/2010 | Khomo et al. |
| 2010/0007717 A1 | 1/2010 | Spektor et al. |
| 2010/0034457 A1 | 2/2010 | Berliner et al. |
| 2010/0036717 A1 | 2/2010 | Trest |
| 2010/0050133 A1 | 2/2010 | Nishihara et al. |
| 2010/0053151 A1 | 3/2010 | Marti et al. |
| 2010/0056274 A1 | 3/2010 | Uusitalo et al. |
| 2010/0060632 A1* | 3/2010 | Lefevre ............ G06T 1/0007 345/419 |
| 2010/0071965 A1 | 3/2010 | Hu et al. |
| 2010/0103103 A1* | 4/2010 | Palanker ........... G06F 3/0425 345/158 |
| 2010/0149096 A1 | 6/2010 | Migos et al. |
| 2010/0162181 A1 | 6/2010 | Shiplacoff et al. |
| 2010/0164897 A1 | 7/2010 | Morin et al. |
| 2010/0177933 A1 | 7/2010 | Willmann et al. |
| 2010/0194863 A1* | 8/2010 | Lopes et al. ................ 348/50 |
| 2010/0199228 A1 | 8/2010 | Latta et al. |
| 2010/0231504 A1 | 9/2010 | Bloem et al. |
| 2010/0234094 A1 | 9/2010 | Gagner et al. |
| 2010/0235786 A1 | 9/2010 | Meizels et al. |
| 2010/0324779 A1 | 12/2010 | Takahashi et al. |
| 2011/0006978 A1 | 1/2011 | Yuan |
| 2011/0018795 A1 | 1/2011 | Jang |
| 2011/0029918 A1 | 2/2011 | Yoo et al. |
| 2011/0043702 A1 | 2/2011 | Hawkins |
| 2011/0052006 A1 | 3/2011 | Gurman et al. |
| 2011/0081072 A1 | 4/2011 | Kawasaki et al. |
| 2011/0164032 A1 | 7/2011 | Shadmi |
| 2011/0164141 A1 | 7/2011 | Tico et al. |
| 2011/0175932 A1 | 7/2011 | Yu et al. |
| 2011/0178784 A1 | 7/2011 | Sato et al. |
| 2011/0188116 A1 | 8/2011 | Ledentsov |
| 2011/0193939 A1 | 8/2011 | Vassigh et al. |
| 2011/0211754 A1 | 9/2011 | Litvak et al. |
| 2011/0225492 A1 | 9/2011 | Boettcher et al. |
| 2011/0225536 A1 | 9/2011 | Shams et al. |
| 2011/0227820 A1 | 9/2011 | Haddick et al. |
| 2011/0231757 A1 | 9/2011 | Haddick et al. |
| 2011/0248914 A1 | 10/2011 | Sherr |
| 2011/0254765 A1 | 10/2011 | Brand |
| 2011/0254798 A1 | 10/2011 | Adamson et al. |
| 2011/0260965 A1 | 10/2011 | Kim et al. |
| 2011/0261058 A1 | 10/2011 | Luo |
| 2011/0267374 A1 | 11/2011 | Sakata et al. |
| 2011/0279397 A1 | 11/2011 | Rimon et al. |
| 2011/0291926 A1 | 12/2011 | Gokturk et al. |
| 2011/0292036 A1 | 12/2011 | Sali et al. |
| 2011/0293137 A1 | 12/2011 | Gurman et al. |
| 2011/0310010 A1 | 12/2011 | Hoffnung et al. |
| 2012/0001875 A1 | 1/2012 | Li et al. |
| 2012/0013609 A1* | 1/2012 | Reponen ............. G06F 3/0346 345/419 |
| 2012/0019703 A1 | 1/2012 | Thorn |
| 2012/0078614 A1 | 3/2012 | Galor et al. |
| 2012/0113104 A1* | 5/2012 | Jung et al. .................. 345/419 |
| 2012/0169583 A1 | 7/2012 | Rippel et al. |
| 2012/0184335 A1 | 7/2012 | Kim et al. |
| 2012/0202569 A1 | 8/2012 | Maizels et al. |
| 2012/0204133 A1 | 8/2012 | Guendelman et al. |
| 2012/0212509 A1* | 8/2012 | Benko .................. G06F 3/033 345/633 |
| 2012/0216151 A1 | 8/2012 | Sarkar et al. |
| 2012/0223882 A1 | 9/2012 | Galor et al. |
| 2012/0313848 A1 | 12/2012 | Galor et al. |
| 2013/0014052 A1 | 1/2013 | Frey et al. |
| 2013/0044053 A1 | 2/2013 | Galor et al. |
| 2013/0055120 A1 | 2/2013 | Galor et al. |
| 2013/0055150 A1 | 2/2013 | Galor |
| 2013/0058565 A1 | 3/2013 | Rafii et al. |
| 2013/0106692 A1 | 5/2013 | Maizels et al. |
| 2013/0107021 A1 | 5/2013 | Maizels et al. |
| 2013/0127854 A1 | 5/2013 | Shpunt et al. |
| 2013/0154913 A1 | 6/2013 | Genc et al. |
| 2013/0155070 A1 | 6/2013 | Luo |
| 2013/0201108 A1 | 8/2013 | Hirsch |
| 2013/0207920 A1 | 8/2013 | McCann et al. |
| 2013/0215148 A1* | 8/2013 | Antonyuk ............ G06F 3/017 345/633 |
| 2013/0222239 A1 | 8/2013 | Galor |
| 2013/0263036 A1 | 10/2013 | Berenson et al. |
| 2013/0265222 A1 | 10/2013 | Berenson et al. |
| 2013/0283208 A1 | 10/2013 | Bychkov et al. |
| 2013/0283213 A1 | 10/2013 | Bychkov et al. |
| 2013/0321265 A1 | 12/2013 | Bychkov et al. |
| 2013/0321271 A1 | 12/2013 | Bychkov et al. |
| 2014/0028548 A1 | 1/2014 | Bychkov et al. |
| 2014/0104274 A1* | 4/2014 | Hilliges ............... G06F 30/20 345/424 |
| 2014/0152552 A1 | 6/2014 | Berliner et al. |
| 2014/0225824 A1 | 8/2014 | Shpunt et al. |

FOREIGN PATENT DOCUMENTS

| | | |
|---|---|---|
| WO | 0051097 A2 | 8/2000 |
| WO | 0159975 A2 | 8/2001 |
| WO | 2003071410 A2 | 8/2003 |
| WO | 2004107272 A1 | 12/2004 |
| WO | 2005003948 A1 | 1/2005 |
| WO | 2005094958 A1 | 10/2005 |
| WO | 2007078639 A1 | 7/2007 |
| WO | 2007079425 A2 | 7/2007 |
| WO | 2007135376 A2 | 11/2007 |
| WO | 2009083984 A2 | 7/2009 |
| WO | 2012107892 A1 | 8/2012 |

OTHER PUBLICATIONS

Microsoft HoloDesk lets Users Handle Virtual 3D objects as published at http://www.gizmag.com/holodesk-lets-users-handle-virtual-3d-objects/20257/ Oct. 24, 2011 by Paul Ridden. (Screen Shots of Holodesk).*

HoloDesk: Direct 3D Interactions with a Situated See-Through Display Microsoft Research available at https://www.youtube.com/watch?v=JHL5tJ9ja_w Oct. 19, 2011 by Microsoft Research (Holodesk) pp. 1-250.*

(56) References Cited

OTHER PUBLICATIONS

3D Hand Model Fitting for Virtual Keyboard System by Du et al IEEE 2007 (Du).*
Hart, D., U.S. Appl. No. 09/616,606, "Method and System for High Resolution , Ultra Fast 3-D Imaging" filed Jul. 14, 2000.
International Application PCT/IL2007/000306 Search Report dated Oct. 2, 2008.
International Application PCT/IL2007/000574 Search Report dated Sep. 10, 2008.
International Application PCT/IL2006/000335 Preliminary Report on Patentability dated Apr. 24, 2008.
Avidan et al., "Trajectory triangulation: 3D reconstruction of moving points from amonocular image sequence", IEEE Transactions on Pattern Analysis and Machine Intelligence (PAMI), vol. 22, No. 4, pp. 348-3537, Apr. 2000.
Leclerc et al., "The direct computation of height from shading", The Proceedings of the IEEE Computer Society Conference on Computer Vision and Pattern Recognition (CVPR), pp. 552-558, USA, Jun. 1991.
Zhang et al., "Shape from intensity gradient", IEEE Transactions on Systems, Man and Cybernetics—Part A Systems and Humans, vol. 29, No. 3, pp. 318-325, May 1999.
Zhang et al., "Height recovery from intensity gradients", IEEE Computer Society Conference on Computer Vision and Pattern Recognition (CVPR), pp. 508-513, Jun. 21-23, 1994.
Horn, B., "Height and gradient from shading", International Journal of Computer Vision, vol. 5, No. 1, pp. 37-76, Aug. 1990.
Bruckstein, A., "On shape from shading", Computer Vision, Graphics & Image Processing, vol. 44, pp. 139-154, year 1988.
Zhang et al., "Rapid Shape Acquisition Using Color Structured Light and Multi-Pass Dynamic Programming", 1st International Symposium on 3D Data Processing Visualization and Transmission (3DPVT), Italy, Jul. 2002.
Besl, P., "Active, Optical Range Imaging Sensors", Machine vision and applications, vol. 1, pp. 127-152, year 1988.
Horn et al., "Toward optimal structured light patterns", Proceedings of International Conference on Recent Advances in 3D Digital Imaging and Modeling, pp. 28-37, Ottawa, Canada, May 1997.
Goodman, J.W., "Statistical Properties of Laser Speckle Patterns", Laser Speckle and Related Phenomena, pp. 9-75, Springer-Verlag, Berlin Heidelberg, 1975.
Asada et al., "Determining Surface Orientation by Projecting a Stripe Pattern", IEEE Transactions on Pattern Analysis and Machine Intelligence (PAMI), vol. 10, No. 5, pp. 749-754, Sep. 1988.
Winkelbach et al., "Shape from Single Stripe Pattern Illumination", Luc Van Gool (Editor), (DAGM 2002), Lecture Notes in Computer Science 2449, p. 240-247, Springer 2002.
Koninckx et al., "Efficient, Active 3D Acquisition, based on a Pattern-Specific Snake", Luc Van Gool (Editor), (DAGM 2002), Lecture Notes in Computer Science 2449, pp. 557-565, Springer 2002.
Kimmel et al., "Analyzing and synthesizing images by evolving curves with the Osher-Sethian method", International Journal of Computer Vision, vol. 24, No. 1, pp. 37-56, year 1997.
Zigelman et al., "Texture mapping using surface flattening via multi-dimensional scaling", IEEE Transactions on Visualization and Computer Graphics, vol. 8, No. 2, pp. 198-207, Apr. 2002.
Dainty, J.C., "Introduction", Laser Speckle and Related Phenomena, pp. 1-7, Springer-Verlag, Berlin Heidelberg, 1975.
Mendlovic et al., "Composite harmonic filters for scale, projection and shift invariant pattern recognition", Applied Optics Journal, vol. 34, No. 2, Jan. 10, 1995.
Fua et al., "Human Shape and Motion Recovery Using Animation Models", 19th Congress, International Society for Photogrammetry and Remote Sensing, Amsterdam, The Netherlands, Jul. 2000.
Allard et al., "Marker-less Real Time 3D modeling for Virtual Reality", Immersive Projection Technology, Iowa State University, year 2004.
Howe et al., "Bayesian Reconstruction of 3D Human Motion from Single-Camera Video", Advanced in Neural Information Processing Systems, vol. 12, pp. 820-826, USA 1999.
Li et al., "Real-Time 3D Motion Tracking with Known Geometric Models", Real-Time Imaging Journal, vol. 5, pp. 167-187, Academic Press 1999.
Grammalidis et al., "3-D Human Body Tracking from Depth Images Using Analysis by Synthesis", Proceedings of the IEEE International Conference on Image Processing (ICIP2001), pp. 185-188, Greece, Oct. 7-10, 2001.
Segen et al., "Shadow gestures: 3D hand pose estimation using a single camera", Proceedings of IEEE International Conference on Computer Vision and Pattern Recognition, pp. 479-485, Fort Collins, USA, 1999.
Vogler et al., "ASL recognition based on a coupling between HMMs and 3D motion analysis", Proceedings of IEEE International Conference on Computer Vision, pp. 363-369, Mumbai, India, 1998.
Nam et al., "Recognition of Hand Gestures with 3D, Nonlinear Arm Movements", Pattern Recognition Letters, vol. 18, No. 1, pp. 105-113, Elsevier Science B.V. 1997.
Nesbat, S., "A System for Fast, Full-Text Entry for Small Electronic Devices", Proceedings of the 5th International Conference on Multimodal Interfaces, ICMI 2003, Vancouver, Nov. 5-7, 2003.
Ascension Technology Corporation, "Flock of Birds: Real-Time Motion Tracking", 2008.
Segen et al., "Human-computer interaction using gesture recognition and 3D hand tracking", ICIP 98, Proceedings of the IEEE International Conference on Image Processing, vol. 3, pp. 188-192, Oct. 4-7, 1998.
Dekker, L., "Building Symbolic Information for 3D Human Body Modeling from Range Data", Proceedings of the Second International Conference on 3D Digital Imaging and Modeling, IEEE computer Society, pp. 388-397, 1999.
Holte et al., "Gesture Recognition using a Range Camera", Technical Report CVMT-07-01 ISSN 1601-3646, Feb. 2007.
Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, 2007.
Microvision Inc., "PicoP® Display Engine—How it Works", 1996-2012.
Primesense Corporation, "PrimeSensor NITE 1.1", USA, year 2010.
ARM Ltd., "AMBA Specification: AHB", Version 2, pp. 35-92, year 1999.
Commission Regulation (EC) No. 1275/2008, Official Journal of the European Union, Dec. 17, 2008.
Primesense, "Natural Interaction", YouTube Presentation, Jun. 9, 2010 http://www.youtube.com/watch?v=TzLKsex43zl~.
Manning et al., "Foundations of Statistical Natural Language Processing", chapters 6,7,9 and 12, MIT Press 1999.
U.S. Appl. No. 12/762,336 Official Action dated May 15, 2012.
Tobii Technology, "The World Leader in Eye Tracking and Gaze Interaction", Mar. 2012.
Noveron, "Madison video eyewear", year 2012.
International Application PCT/IB2012/050577 Search Report dated Aug. 6, 2012.
U.S. Appl. No. 12/683,452 Official Action dated Sep. 7, 2012.
Koutek, M., "Scientific Visualization in Virtual Reality: Interaction Techniques and Application Development", PhD Thesis, Delft University of Technology, 264 pages, Jan. 2003.
Azuma et al., "Recent Advances in Augmented Reality", IEEE Computer Graphics and Applications, vol. 21, issue 6, pp. 34-47, Nov. 2001.
Breen et al., "Interactive Occlusion and Collision of Real and Virtual Objects in Augmented Reality", Technical Report ECRC-95-02, ECRC, Munich, Germany, 22 pages, year 1995.
Burdea et al., "A Distributed Virtual Environment with Dextrous Force Feedback", Proceedings of Interface to Real and Virtual Worlds Conference, pp. 255-265, Mar. 1992.
Bleiwess et al., "Fusing Time-of-Flight Depth and Color for Real-Time Segmentation and Tracking", Dyn3D 2009, Lecture Notes in Computer Science 5742, pp. 58-69, Jena, Germany, Sep. 9, 2009.

(56) References Cited

OTHER PUBLICATIONS

Bleiwess et al., "Markerless Motion Capture Using a Single Depth Sensor", SIGGRAPH Asia 2009, Yokohama, Japan, Dec. 16-19, 2009.
Bevilacqua et al., "People Tracking Using a Time-of-Flight Depth Sensor", Proceedings of the IEEE International Conference on Video and Signal Based Surveillance, Sydney, Australia, Nov. 22-24, 2006.
Bradski, G., "Computer Vision Face Tracking for Use in a Perceptual User Interface", Intel Technology Journal, vol. 2, issue 2 (2nd Quarter 2008).
Comaniciu et al., "Kernel-Based Object Tracking", IEEE Transactions on Pattern Analysis and Machine Intelligence, vol. 25, No. 5, pp. 564-577, May 2003.
Gesturetec Inc., "Gesture Control Solutions for Consumer Devices", Canada, 2009.
Gokturk et al., "A Time-of-Flight Depth Sensor—System Description, Issues and Solutions", Proceedings of the 2004 Conference on Computer Vision and Patter Recognition Workshop (CVPRW'04), vol. 3, p. 35, Jun. 27-Jul. 2, 2004.
Grest et al., "Single View Motion Tracking by Depth and Silhouette Information", SCIA 2007—Scandinavian Conference on Image Analysis, Lecture Notes in Computer Science 4522, pp. 719-729, Aalborg, Denmark, Jun. 10-14, 2007.
Haritaoglu et al., "Ghost 3d: Detecting Body Posture and Parts Using Stereo", Proceedings of the IEEE Workshop on Motion and Video Computing (MOTION'02), pp. 175-180, Orlando, USA, Dec. 5-6, 2002.
Haritaoglu et al., "W4S : A real-time system for detecting and tracking people in 2<½>D", ECCV 98—5th European conference on computer vision, vol. 1407, pp. 877-892, Freiburg , Germany, Jun. 2-6, 1998.
Harville, M., "Stereo Person Tracking with Short and Long Term Plan-View Appearance Models of Shape and Color", Proceedings of the IEEE International Conference on Advanced Video and Signal-Based Surveillance (AVSSS-2005), pp. 522-527, Como, Italy, Sep. 15-16, 2005.
Holte, M., "Fusion of Range and Intensity Information for View Invariant Gesture Recognition", IEEE Conference on Computer Vision and Pattern Recognition Workshops (CVPRW '08), pp. 1-7, Anchorage, USA, Jun. 23-28, 2008.
Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.
Kolb et al., "ToF-Sensors: New Dimensions for Realism and Interactivity", Proceedings of the IEEE Conference on Computer Vision and Patter Recognition Workshops, pp. 1-6, Anchorage, USA, Jun. 23-28, 2008.
Kolsch et al., "Fast 2D Hand Tracking with Flocks of Features and Multi-Cue Integration", IEEE Workshop on Real-Time Vision for Human Computer Interaction (at CVPR'04), Washington, USA, Jun. 27-Jul. 2, 2004.
Krumm et al., "Multi-Camera Multi-Person Tracking for EasyLiving", 3rd IEEE International Workshop on Visual Surveillance, Dublin, Ireland, Jul. 1, 2000.
Leens et al., "Combining Color, Depth, and Motion for Video Segmentation", ICVS 2009—7th International Conference on Computer Vision Systems, Liege, Belgium Oct. 13-15, 2009.
Maccormick et al., "Partitioned Sampling, Articulated Objects, and Interface-Quality Hand Tracking", ECCV '00—Proceedings of the 6th European Conference on Computer Vision—Part II, pp. 3-19, Dublin, Ireland, Jun. 26-Jul. 1, 2000.
Malassiotis et al., "Real-Time Hand Posture Recognition Using Range Data", Image and Vision Computing, vol. 26, No. 7, pp. 1027-1037, Jul. 2, 2008.
Morano et al., "Structured Light Using Pseudorandom Codes", IEEE Transactions on Pattern Analysis and Machine Intelligence, vol. 20, issue 3, pp. 322-327, Mar. 1998.
Munoz-Salinas et al., "People Detection and Tracking Using Stereo Vision and Color", Image and Vision Computing, vol. 25, No. 6, pp. 995-1007, Jun. 1, 2007.
Nanda et al., "Visual Tracking Using Depth Data", Proceedings of the 2004 Conference on Computer Vision and Patter Recognition Workshop, vol. 3, Washington, USA, Jun. 27-Jul. 2, 2004.
Scharstein et al., "High-Accuracy Stereo Depth Maps Using Structured Light", IEEE Conference on Computer Vision and Patter Recognition, vol. 1, pp. 195-2002, Madison, USA, Jun. 2003.
Shi et al., "Good Features to Track", IEEE Conference on Computer Vision and Pattern Recognition, pp. 593-600, Seattle, USA, Jun. 21-23, 1994.
Siddiqui et al., "Robust Real-Time Upper Body Limb Detection and Tracking", Proceedings of the 4th ACM International Workshop on Video Surveillance and Sensor Networks, Santa Barbara, USA, Oct. 27, 2006.
Softkinetic S.A., IISU™—3D Gesture Recognition Platform for Developers of 3D Applications, Belgium, Brussels, 2007-2010.
Sudderth et al., "Visual Hand Tracking Using Nonparametric Belief Propagation", IEEE Workshop on Generative Model Based Vision at CVPR'04, Washington, USA, Jun. 27-Jul. 2, 2004.
Tsap, L., "Gesture-Tracking in Real Time with Dynamic Regional Range Computation", Real-Time Imaging, vol. 8, issue 2, pp. 115-126, Apr. 2002.
Xu et al., "A Multi-Cue-Based Human Body Tracking System", Proceedings of the 5ths International Conference on Computer Vision Systems (ICVS 2007), Germany, Mar. 21-24, 2007.
Xu et al., "Human Detecting Using Depth and Gray Images", Proceedings of the IEE Conference on Advanced Video and Signal Based Surveillance (AVSS'03), Miami, USA, Jul. 21-22, 2003.
Yilmaz et al., "Object Tracking: A Survey", ACM Computing Surveys, vol. 38, No. 4, article 13, Dec. 2006.
Zhu et al., "Controlled Human Pose Estimation From Depth Image Streams", IEEE Conference on Computer Vision and Patter Recognition Workshops, pp. 1-8, Anchorage, USA, Jun. 23-27, 2008.
International Application PCT/IB2010/051055 Search Report dated Sep. 1, 2010.
La Viola, J. Jr., "Whole-Hand and Speech Input in Virtual Environments", Computer Science Department, Florida Atlantic University, USA, 1996.
Martell, C., "Form: An Experiment in the Annotation of the Kinematics of Gesture", Dissertation, Computer and Information Science, University of Pennsylvania, 2005.
U.S. Appl. No. 12/352,622 Official Action dated Mar. 31, 2011.
Prime Sense Inc., "Prime Sensor™ NITE 1.1 Framework Programmer's Guide", Version 1.2, year 2009.
Primesense Corporation, "PrimeSensor Reference Design 1.08", USA, year 2010.
International Application PCT/IB2011/053192 Search Report dated Dec. 6, 2011.
U.S. Appl. No. 12/352,622 Official Action dated Sep. 30, 2011.
Gordon et al., "The use of Dense Stereo Range Date in Augmented Reality", Proceedings of the 1st International Symposium on Mixed and Augmented Reality (ISMAR), Darmstadt, Germany, pp. 1-10, Sep. 30-Oct. 1, 2002.
Agrawala et al., "The two-user Responsive Workbench :support for collaboration through individual views of a shared space", Proceedings on the 24th conference on computer graphics and interactive techniques (SIGGRAPH 97), Los Angeles, USA, pp. 327-332 , Aug. 3-8, 1997.
Harman et al.,"Rapid 2D-to 3D conversion", Proceedings of SPIE Conference on Stereoscopic Displays and Virtual Reality Systems, vol. 4660, pp. 78-86, Jan. 21-23, 2002.
Hoff et al., "Analysis of head pose accuracy in augmented reality", IEEE Transactions on Visualization and Computer Graphics, vol. 6, No. 4, pp. 319-334, Oct.-Dec. 2000.
Poupyrev et al., "The go-go interaction technique: non-liner mapping for direct manipulation in VR", Proceedings of the 9th annual ACM Symposium on User interface software and technology (UIST '96), Washington, USA, pp. 79-80, Nov. 6-8, 1996.
Wexelblat et al., "Virtual Reality Applications and Explorations", Academic Press Inc., San Diego, USA, 262 pages, year 1993.
U.S. Appl. No. 13/161,508 Office Action dated Apr. 10, 2013.

(56) References Cited

OTHER PUBLICATIONS

U.S. Appl. No. 12/683,452 Office Action dated Jun. 7, 2013.
Miller, R., "Kinect for XBox 360 Review", Engadget, Nov. 4, 2010.
U.S. Appl. No. 13/161,508 Office Action dated Sep. 9, 2013.
International Application PCT/IB2013/052332 Search Report dated Aug. 26, 2013.
U.S. Appl. No. 13/314,210 Office Action dated Jul. 19, 2013.
U.S. Appl. No. 13/314,207 Office Action dated Aug. 5, 2013.
Sun et al., "SRP Based Natural Interaction Between Real and Virtual Worlds in Augmented Reality", Proceedings of the International Conference on Cyberworlds (CW'08), pp. 117-124, Sep. 22-24, 2008.
Schmalstieg et al., "The Studierstube Augmented Reality Project", Presence: Teleoperators and Virtual Environments, vol. 11, No. 1, pp. 33-54, Feb. 2002.
Ohta et al., "Share-Z: Client/Server Depth Sensing for See-Through Head-Mounted Displays", Presence Teleoperators and Virtual Environments, vol. 11, No. 2, pp. 176-188, Apr. 2002.
Gobbetti et al., "VB2: an Architecture for Interaction in Synthetic Worlds", Proceedings of the 6th Annual ACM Symposium on User Interface Software and Technology (UIST'93), pp. 167-178, Nov. 3-5, 1993.
Gargallo et al., "Bayesian 3D Modeling from Images Using Multiple Depth Maps", Proceedings of the IEEE Computer Society Conference on Computer Vision and Pattern Recognition (CVPR'05), vol. 2, pp. 885-891, Jun. 20-25, 2005.
Zrro Ltd., "TeleTouch Device", year 2011 (http://www.zrro.com/products.html).
U.S. Appl. No. 13/849,514 Office Action dated Feb. 20, 2015.
Yip et al., "Pose Determination and Viewpoint Determination of Human Head in Video Conferencing Based on Head Movement", IEEE Proceedings of the 10th International Multimedia Modelling Conference, 6 pages, Jan. 2004.
Bohme et al., "Head tracking with combined face and nose detection", IEEE International Symposium on Signals, Circuits and Systems, 4 pages, year 2009.
Breitenstein et al., "Real-time face pose estimation from single range images", IEEE Conference on Computer Vision and Pattern Recognition (CVPR), 8 pages, Jun. 2008.
Feldmann et al., "Immersive Multi-User 3d Video Communication", Proceedings of International Broadcast Conference (IBC), 8 pages, Sep. 2009.
Haker et al., "Geometric Invariants for Facial Feature Tracking with 3D TOF cameras", IEEE International Symposium on Signals, Circuits and Systems, vol. 1, 4 pages, year 2007.
Malassiotis et al., "Robust Real-Time 3D Head Pose Estimation from Range Date", Pattern Recognition 38.8, 31 pages, year 2005.
Stipes et al., "4D Scan Registration with the SR-3000 LIDAR", IEEE International Conference on Robotics and Automation, pp. 2988-2993, May 19-23, 2008.
U.S. Appl. No. 13/984,031 Office Action dated Jul. 2, 2015.
U.S. Appl. No. 13/960,822 Office Action dated May 29, 2015.
CN Application # 201280007484.1 Office Action dated Jul. 8, 2015.
U.S. Appl. No. 13/960,823 Office Action dated Jun. 19, 2015.
U.S. Appl. No. 13/244,490 Office Action dated Dec. 6, 2013.
U.S. Appl. No. 13/423,314 Office Action dated Dec. 4, 2013.
U.S. Appl. No. 13/423,322 Office Action dated Nov. 1, 2013.
U.S. Appl. No. 13/849,514 Office Action dated Dec. 2, 2015.
U.S. Appl. No. 13/960,822 Office Action dated Nov. 24, 2015.
U.S. Appl. No. 13/960,823 Office Action dated Nov. 20, 2015.
Irie et al., "Construction of an intelligent room based on gesture recognition: operation of electric appliances with hand gestures", Proceedings of 2004 IEEE/RSJ International Conference on Intelligent Robots and Systems, vol. 1, pp. 193-198, Sep. 28-Oct. 2, 2004.
CN Application #201280007484.1 Office Action dated Dec. 15, 2015.
U.S. Appl. No. 13/960,822 Office Action dated Aug. 13, 2015.
KR Application # 10-2014-7029627 Office Action dated Aug. 28, 2015.
CN Application # 201380016670.6 Search Report dated Oct. 9, 2016.
Bergh et al., "Perceptive User Interface, a Generic Approach", Computer Vision in Human-Computer Interaction, ICCV 2005 Workshop on HCI(LNCS3766, Springer, 2005), pp. 60-69, Jan. 1, 2005.
Cheng et al., "Interaction Paradigms for Bare-Hand Interaction with Large Displays at a Distance", Human-Computer Interaction, pp. 195-223, Dec. 1, 2009.
European Application # 12745037.7 Search Report dated Aug. 10, 2017.
U.S. Appl. No. 15/256,654 Office Action dated Jun. 7, 2017.
CN Application # 201610451134.4 office action dated Jul. 4, 2018.
European Application # 19167819.2 search report dated Jul. 15, 2019.
Hosoya et al., "Arm-Pointer: 3D Pointing Interface for Real-World Interaction", International Workshop on Computer Vision in Human-Computer Interaction ,CVHCI 2004, pp. 72-82, May 13, 2004.
CN Application # 201710928464.2 office action dated May 4, 2020.

\* cited by examiner

FIG. 6A

| FEBRUARY 2012 | | | | | | |
|---|---|---|---|---|---|---|
| Sun | Mon | Tue | Wed | Thr | Fri | Sat |
| | | | Sales Meeting Dad's retirement | Groundhog Day Dentist Appt | | |
| | Team Status Report | | | | | |
| 29 | 30 | 31 | 1 | 2 | 3 | 4 |
| | | Valentine's Day Dinner with Kim | | Claudia's b/d | Santiago trip | Santiago trip |
| | Team Status Report | | | | | |
| 5 | 6 | 7 | 8 | 9 | 10 | 11 |
| Lincoln's b/d | | Visit Mom | Return books | Regional Sales.. Quarterly report | Happy hour | Cooking club Meeting |
| | Team Status Report | | | | | |
| 12 | 13 | 14 | 15 | 16 | 17 | 18 |
| Santiago trip Ultimate frisbee | Presidents Day Team Status Report | Dog groomers | Chent Lunch | | Office party Kris's soccer game | Cooking club Meeting |
| 19 | 20 | 21 | 22 | 23 | 24 | 25 |
| | Team Status Report | | 29 | | 1 | 2 |
| 26 | 27 | 28 | | | | 3 |

ENHANCED VIRTUAL TOUCHPAD

RELATED APPLICATIONS

This application claims the benefit of U.S. Provisional Patent Application 61/615,403, filed Mar. 26, 2012, and U.S. Provisional Patent Application 61/663,638, filed Jun. 25, 2012, which are incorporated herein by reference. This application is related to another U.S. patent application, filed on even date, entitled, "Gaze-Enhanced Virtual Touchscreen."

FIELD OF THE INVENTION

This invention relates generally to user interfaces for computerized systems, and specifically to user interfaces that are based on three-dimensional sensing.

BACKGROUND

Many different types of user interface devices and methods are currently available. Common tactile interface devices include a computer keyboard, a mouse and a joystick. Touch screens detect the presence and location of a touch by a finger or other object within the display area. Infrared remote controls are widely used, and "wearable" hardware devices have been developed, as well, for purposes of remote control.

Computer interfaces based on three-dimensional (3D) sensing of parts of a user's body have also been proposed. For example, PCT International Publication WO 03/071410, whose disclosure is incorporated herein by reference, describes a gesture recognition system using depth-perceptive sensors. A 3D sensor, typically positioned in a room in proximity to the user, provides position information, which is used to identify gestures created by a body part of interest. The gestures are recognized based on the shape of the body part and its position and orientation over an interval. The gesture is classified for determining an input into a related electronic device.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

As another example, U.S. Pat. No. 7,348,963, whose disclosure is incorporated herein by reference, describes an interactive video display system, in which a display screen displays a visual image, and a camera captures 3D information regarding an object in an interactive area located in front of the display screen. A computer system directs the display screen to change the visual image in response to changes in the object.

Three-dimensional human interface systems may identify not only the user's hands, but also other parts of the body, including the head, torso and limbs. For example, U.S. Patent Application Publication 2010/0034457, whose disclosure is incorporated herein by reference, describes a method for modeling humanoid forms from depth maps. The depth map is segmented so as to find a contour of the body. The contour is processed in order to identify a torso and one or more limbs of the subject. An input is generated to control an application program running on a computer by analyzing a disposition of at least one of the identified limbs in the depth map.

Some user interface systems track the direction of the user's gaze. For example, U.S. Pat. No. 7,762,665, whose disclosure is incorporated herein by reference, describes a method of modulating operation of a device, comprising: providing an attentive user interface for obtaining information about an attentive state of a user; and modulating operation of a device on the basis of the obtained information, wherein the operation that is modulated is initiated by the device. Preferably, the information about the user's attentive state is eye contact of the user with the device that is sensed by the attentive user interface.

SUMMARY OF THE INVENTION

There is provided, in accordance with an embodiment of the present invention a method, including receiving, by a computer, a two-dimensional image (2D) containing at least a physical surface, segmenting the physical surface into one or more physical regions, assigning a functionality to each of the one or more physical regions, each of the functionalities corresponding to a tactile input device, receiving a sequence of three-dimensional (3D) maps containing at least a hand of a user of the computer, the hand positioned on one of the physical regions, analyzing the 3D maps to detect a gesture performed by the user, and simulating, based on the gesture, an input for the tactile input device corresponding to the one of the physical regions.

There is also provided, in accordance with an embodiment of the present invention an apparatus, including a sensing device configured to receive a two dimensional (2D) image containing at least a physical surface, and to receive a sequence of three dimensional (3D) maps containing at least a hand of a user, the hand positioned on the physical surface, a display, and a computer coupled to the sensing device and the display, and configured to segment the physical surface into one or more physical regions, to assign a functionality to each of the one or more physical regions, each of the functionalities corresponding to a tactile input device, to analyze the 3D maps to detect a gesture performed by the user, and to simulate, based on the gesture, an input for the tactile input device corresponding to the one of the physical regions.

There is further provided, in accordance with an embodiment of the present invention a computer software product, including a non-transitory computer-readable medium, in which program instructions are stored, which instructions, when read by a computer, cause the computer to receive a two-dimensional image (2D) containing at least a physical surface, to segment the physical surface into one or more physical regions, to assign a functionality to each of the one or more physical regions, each of the functionalities corresponding to a tactile input device, to receive a sequence of three-dimensional (3D) maps containing at least a hand of a user of the computer, the hand positioned on one of the physical regions, to analyze the 3D maps to detect a gesture performed by the user, and to simulate, based on the gesture, an input for the tactile input device corresponding to the one of the physical regions.

There is additionally provided, in accordance with an embodiment of the present invention a method, including receiving a sequence of three-dimensional (3D) maps containing at least a physical surface, one or more physical objects positioned on the physical surface, and a hand of a user of the computer, the hand positioned in proximity to the physical surface, analyzing the 3D maps to detect a gesture performed by the user, projecting, onto the physical surface, an animation in response to the gesture, and incorporating the one or more physical objects into the animation.

There is also provided, in accordance with an embodiment of the present invention an apparatus, including a sensing device configured to receive a sequence of three dimensional (3D) maps containing at least a physical surface, one or more physical objects positioned on the physical surface, and a hand of a user, the hand positioned in proximity to the physical surface, a projector, and a computer coupled to the sensing device and the projector, and configured to analyze the 3D maps to detect a gesture performed by the user, to present, using the projector, an animation onto the physical surface in response to the gesture, and to incorporate the one or more physical objects into the animation.

There is further provided, in accordance with an embodiment of the present invention a computer software product, including a non-transitory computer-readable medium, in which program instructions are stored, which instructions, when read by a computer, cause the computer to receive a sequence of three-dimensional maps containing at least a physical surface, one or more physical objects positioned on the physical surface, and a hand of a user of the computer, the hand positioned in proximity to the physical surface, to analyze the 3D maps to detect a gesture performed by the user, to project, onto the physical surface, an animation in response to the gesture, and to incorporate the one or more physical objects into the animation.

There is additionally provided, in accordance with an embodiment of the present invention a method, including receiving, by a computer, a two-dimensional image (2D) containing at least a physical surface, segmenting the physical surface into one or more physical regions, assigning a functionality to each of the one or more physical regions, each of the functionalities corresponding to a tactile input device, receiving a sequence of three-dimensional (3D) maps containing at least an object held by a hand of a user of the computer, the object positioned on one of the physical regions, analyzing the 3D maps to detect a gesture performed by the object, and simulating, based on the gesture, an input for the tactile input device corresponding to the one of the physical regions.

There is also provided, in accordance with an embodiment of the present invention an apparatus, including a sensing device configured to receive a two dimensional (2D) image containing at least a physical surface, and to receive a sequence of three dimensional (3D) maps containing at least an object held by a hand of a user, the object positioned on the physical surface, a display, and a computer coupled to the sensing device and the display, and configured to segment the physical surface into one or more physical regions, to assign a functionality to each of the one or more physical regions, each of the functionalities corresponding to a tactile input device, to analyze the 3D maps to detect a gesture performed by the object, and to simulate, based on the gesture, an input for the tactile input device corresponding to the one of the physical regions.

There is further provided, in accordance with an embodiment of the present invention a computer software product, including a non-transitory computer-readable medium, in which program instructions are stored, which instructions, when read by a computer, cause the computer to receive a two-dimensional image (2D) containing at least a physical surface, to segment the physical surface into one or more physical regions, to assign a functionality to each of the one or more physical regions, each of the functionalities corresponding to a tactile input device, to receive a sequence of three-dimensional (3D) maps containing at least an object held by a hand of a user of the computer, the object positioned on one of the physical regions, to analyze the 3D maps to detect a gesture performed by the object, and to simulate, based on the gesture, an input for the tactile input device corresponding to the one of the physical regions.

BRIEF DESCRIPTION OF THE DRAWINGS

The disclosure is herein described, by way of example only, with reference to the accompanying drawings, wherein:

FIGS. 6A and 6B are schematic pictorial illustrations of a calendar application executing on the computer and presented on the display, in accordance with an embodiment of the present invention;

DETAILED DESCRIPTION OF EMBODIMENTS

Overview

When using physical tactile input devices such as buttons, rollers or touch screens, a user typically engages and disengages control of a user interface by touching and/or manipulating the physical device. Embodiments of the present invention describe gestures that can be performed by a user in order to engage interactive items presented on a display coupled to a computer executing a user interface that includes three-dimensional (3D) sensing.

As explained hereinbelow, a user can select a given one of the interactive items by gazing at the given interactive item, and manipulate the given interactive item by performing two-dimensional (2D) gestures on a tactile input device, such as a touchscreen or a touchpad. In some embodiments the computer can defines a virtual surface that emulates a touchpad or a touchscreen. The virtual surface can be implemented on a physical surface such as a book or a desktop, and the user can interact with the user interface by performing 2D gestures on the physical surface. In alternative embodiments, the virtual surface can be implemented in space in proximity to the user, and the user can interact with the computer by performing 3D gestures, as described hereinbelow.

In further embodiments, when configuring the physical surface as a virtual surface, the physical surface can be configured as a single input device, such as a touchpad. Alternatively, the physical surface can be divided into physical regions, and a respective functionality can be assigned to each of the physical regions. For example, a first physical region can be configured as a keyboard, a second physical region can be configured as a mouse, and a third physical region can be configured as a touchpad.

In additional embodiments, as described hereinbelow, a projector can be configured to project graphical images onto the physical surface, thereby enabling the physical surface to function as an interactive touchscreen on which visual elements can be drawn and manipulated in response to gestures performed by the user.

System Description

Figure 1:
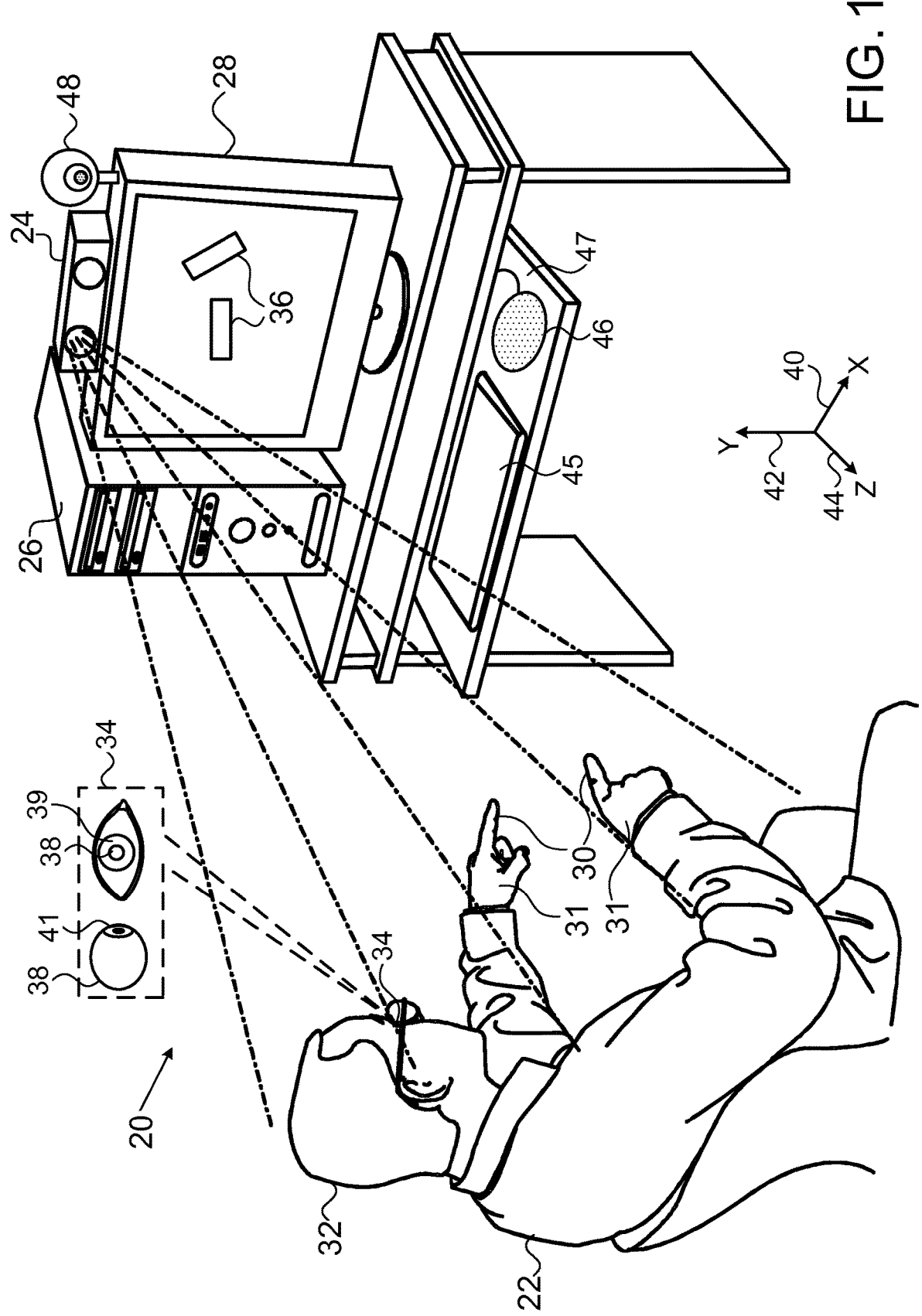
FIG. 1 is a schematic, pictorial illustration of a computer system implementing a non-tactile three-dimensional (3D) user interface, in accordance with an embodiment of the present invention.

FIG. 1 is a schematic, pictorial illustration of a non-tactile 3D user interface 20 for operation by a user 22 of a computer 26, in accordance with an embodiment of the present invention. (Although for the sake of simplicity, only a single user and user interface are shown in the figure, in practice interface 20 may interact with multiple users concurrently. Alternative embodiments of the present invention may use different user interfaces and/or support multiple user interfaces across different devices). User interface 20 in the pictured embodiment is based, by way of example, on a 3D sensing device 24, which captures 3D scene information that includes a body, or at least parts of the body, such as a finger 30, a hand 31, a head 32, or eyes 34. Device 24 or a separate camera (not shown in the figures) may also capture color video images of the scene. The information captured by device 24 is processed by computer 26, which drives a display screen 28 accordingly to present and manipulate on-screen interactive items 36 (also referred to herein as interactive items). Alternatively, the user interface may be used in conjunction with any type of computerized equipment, such as a laptop, a tablet computer, a television, etc.

While FIG. 1 shows computer 26 in a tower configuration, other configurations of the computer are considered to be within the spirit and scope of the present invention. For example, computer 26 may be configured as a desktop computer, a portable computer (e.g., a laptop) or an all-in-one computer.

Computer 26 processes data generated by device 24 in order to reconstruct a 3D map of user 22. The term "3D map" (or equivalently, "depth map") refers to a set of 3D coordinates representing a surface of a given object, in this case the user's body. In one embodiment, device 24 projects a pattern of spots onto the object and captures an image of the projected pattern. Computer 26 then computes the 3D coordinates of points on the surface of the user's body by triangulation, based on transverse shifts of the spots in the imaged pattern. The 3D coordinates are measured, by way of example, with reference to a generally horizontal X-axis 40, a generally vertical Y-axis 42 and a depth Z-axis 44, based on device 24. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, system 20 may use other methods of 3D mapping, using single or multiple cameras or other types of sensors, as are known in the art.

In some embodiments, device 24 detects the location and direction of eyes 34 of user 22, typically by processing and analyzing an image comprising light (typically infrared and/or a color produced by the red-green-blue additive color model) reflecting from one or both eyes 34, in order to find a direction of the user's gaze. In alternative embodiments, computer 26 (either by itself or in combination with device 24) detects the location and direction of the eyes 34 of the user. The reflected light may originate from a light projecting source of device 24, or any other natural (e.g., sunlight) or artificial (e.g., a lamp) source. Using techniques that are known in the art such as detecting pupil center and corneal reflections (PCCR), device 24 may process and analyze an image comprising light reflecting from an element of eye 34, such as a pupil 38, an iris 39 or a cornea 41, in order to find the direction of the user's gaze. Additionally, device 24 may convey (to computer 26) the light reflecting from the cornea as a glint effect.

The location and features of the user's head (e.g., an edge of the eye, a nose or a nostril) that are extracted by computer from the 3D map may be used in finding coarse location coordinates of the user's eyes, thus simplifying the determination of precise eye position and gaze direction, and making the gaze measurement more reliable and robust. Furthermore, computer 26 can readily combine the 3D location of parts of head 32 (e.g., eye 34) that are provided by the 3D map with gaze angle information obtained via eye part image analysis in order to identify a given on-screen object 36 at which the user is looking at any given time. This use of 3D mapping in conjunction with gaze tracking allows user 22 to move head 32 freely while alleviating the need to actively track the head using sensors or emitters on the head, as in some eye tracking systems that are known in the art.

By tracking eye 34, embodiments of the present invention may reduce the need to re-calibrate user 22 after the user moves head 32. In some embodiments, computer 26 may use depth information for head 32, eye 34 and pupil 38, in order to track the head's movement, thereby enabling a reliable gaze angle to be calculated based on a single calibration of user 22. Utilizing techniques that are known in the art such as PCCR, pupil tracking, and pupil shape, computer 26 may calculate a gaze angle of eye 34 from a fixed point of head 32, and use the head's location information in order to re-calculate the gaze angle and enhance the accuracy of the aforementioned techniques. In addition to reduced calibrations, further benefits of tracking the head may include reducing the number of light projecting sources and reducing the number of cameras used to track eye 34.

In addition to processing data generated by device 24, computer 26 can process signals from tactile input devices such as a keyboard 45 and a touchpad 46 that rest on a physical surface 47 (e.g., a desktop). Touchpad 46 (also referred to as a gesture pad) comprises a specialized surface that can translate the motion and position of fingers 30 to a relative position on display 28. In some embodiments, as user 22 moves a given finger 30 along the touchpad, the computer can responsively present a cursor (not shown) at locations corresponding to the finger's motion. For example, as user 22 moves a given finger 30 from right to left along touchpad 46, computer 26 can move a cursor from right to left on display 28.

In some embodiments, display 28 may be configured as a touchscreen comprising an electronic visual display that can detect the presence and location of a touch, typically by one or more fingers 30 or a stylus (not shown) within the display area. When interacting with the touchscreen, user 22 can interact directly with interactive items 36 presented on the touchscreen, rather than indirectly via a cursor controlled by touchpad 46.

In additional embodiments a projector 48 may be coupled to computer 26 and positioned above physical surface 47. As explained hereinbelow projector 48 can be configured to project an image on physical surface 47.

Computer 26 typically comprises a general-purpose computer processor, which is programmed in software to carry out the functions described hereinbelow. The software may be downloaded to the processor in electronic form, over a network, for example, or it may alternatively be provided on non-transitory tangible computer-readable media, such as optical, magnetic, or electronic memory media. Alternatively or additionally, some or all of the functions of the computer processor may be implemented in dedicated hardware, such as a custom or semi-custom integrated circuit or a programmable digital signal processor (DSP). Although computer 26 is shown in FIG. 1, by way of example, as a separate unit from sensing device 24, some or all of the processing functions of the computer may be performed by suitable dedicated circuitry within the housing of the sensing device or otherwise associated with the sensing device.

As another alternative, these processing functions may be carried out by a suitable processor that is integrated with display 28 (in a television set, for example) or with any other suitable sort of computerized device, such as a game console or a media player. The sensing functions of device 24 may likewise be integrated into the computer or other computerized apparatus that is to be controlled by the sensor output.

Various techniques may be used to reconstruct the 3D map of the body of user 22. In one embodiment, computer 26 extracts 3D connected components corresponding to the parts of the body from the depth data generated by device 24. Techniques that may be used for this purpose are described, for example, in U.S. patent application Ser. No. 12/854,187, filed Aug. 11, 2010, whose disclosure is incorporated herein by reference. The computer analyzes these extracted components in order to reconstruct a "skeleton" of the user's body, as described in the above-mentioned U.S. Patent Application Publication 2010/0034457, or in U.S. patent application Ser. No. 12/854,188, filed Aug. 11, 2010, whose disclosure is also incorporated herein by reference. In alternative embodiments, other techniques may be used to identify certain parts of the user's body, and there is no need for the entire body to be visible to device 24 or for the skeleton to be reconstructed, in whole or even in part.

Using the reconstructed skeleton, computer 26 can assume a position of a body part such as a tip of finger 30, even though the body part (e.g., the fingertip) may not be detected by the depth map due to issues such as minimal object size and reduced resolution at greater distances from device 24. In some embodiments, computer 26 can auto-complete a body part based on an expected shape of the human part from an earlier detection of the body part, or from tracking the body part along several (previously) received depth maps. In some embodiments, computer 26 can use a 2D color image captured by an optional color video camera (not shown) to locate a body part not detected by the depth map.

In some embodiments, the information generated by computer as a result of this skeleton reconstruction includes the location and direction of the user's head, as well as of the arms, torso, and possibly legs, hands and other features, as well. Changes in these features from frame to frame (i.e. depth maps) or in postures of the user can provide an indication of gestures and other motions made by the user. User posture, gestures and other motions may provide a control input for user interaction with interface 20. These body motions may be combined with other interaction modalities that are sensed by device 24, including user eye movements, as described above, as well as voice commands and other sounds. Interface 20 thus enables user 22 to perform various remote control functions and to interact with applications, interfaces, video programs, images, games and other multimedia content appearing on display 28.

Figure 2:
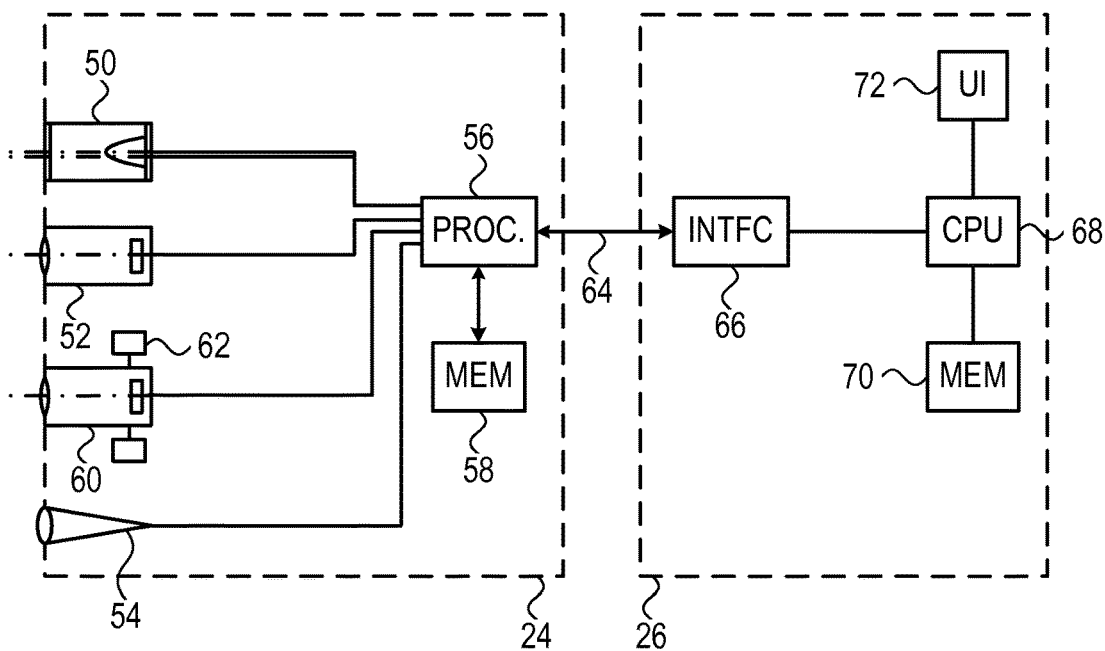
FIG. 2 is a block diagram that schematically illustrates functional components of the computer system implementing the non-tactile 3D user interface, in accordance with an embodiment of the present invention.

FIG. 2 is a block diagram that schematically illustrates functional components of user interface 20, in accordance with an embodiment of the present invention. Sensing device 24 comprises an illumination subassembly 50, which projects a pattern onto the scene of interest. A depth imaging subassembly 52, such as a suitably-configured video camera, captures images of the pattern on the scene. Typically, illumination subassembly 50 and imaging subassembly 52 operate in the infrared range, although other spectral ranges may also be used. Optionally, a color video camera (not shown) in device 24 captures 2D color images of the scene, and a microphone 54 may also capture sound.

A processor 56 receives the images from subassembly 52 and compares the pattern in each image to a reference pattern stored in a memory 58. The reference pattern is typically captured in advance by projecting the pattern onto a reference plane at a known distance from device 24. Processor 56 computes local shifts of parts of the pattern over the area of the 3D map and translates these shifts into depth coordinates. Details of this process are described, for example, in PCT International Publication WO 2010/004542, whose disclosure is incorporated herein by reference. Alternatively, as noted earlier, device 24 may be configured to generate 3D maps by other means that are known in the art, such as stereoscopic imaging, sonar-like devices (sound based/acoustic), wearable implements, lasers, or time-of-flight measurements.

Processor 56 typically comprises an embedded microprocessor, which is programmed in software (or firmware) to carry out the processing functions that are described hereinbelow. The software may be provided to the processor in electronic form, over a network, for example; alternatively or additionally, the software may be stored on non-transitory tangible computer-readable media, such as optical, magnetic, or electronic memory media. Processor 56 also comprises suitable input and output interfaces and may comprise dedicated and/or programmable hardware logic circuits for carrying out some or all of its functions. Details of some of these processing functions and circuits that may be used to carry them out are presented in the above-mentioned Publication WO 2010/004542.

In some embodiments, a gaze sensor 60 detects the gaze direction of eyes 34 of user 22 by capturing and processing two dimensional images of user 22. In alternative embodiments, computer 26 detects the gaze direction by processing a sequence of 3D maps conveyed by device 24. Sensor 60 may use any suitable method of eye tracking that is known in the art, such as the method described in the above-mentioned U.S. Pat. No. 7,762,665 or in U.S. Pat. No. 7,809,160, whose disclosure is incorporated herein by reference, or the alternative methods described in references cited in these patents. For example, sensor 60 may capture an image of light (typically infrared light) that is reflected from the fundus and/or the cornea of the user's eye or eyes. This light may be projected toward the eyes by illumination subassembly 50 or by another projection element (not shown) that is associated with sensor 60. Sensor 60 may capture its image with high resolution over the entire region of interest of user interface 20 and may then locate the reflections from the eye within this region of interest. Alternatively, imaging subassembly 52 may capture the reflections from the user's eyes (ambient light, reflection from monitor) in addition to capturing the pattern images for 3D mapping.

As another alternative, processor 56 may drive a scan control 62 to direct the field of view of gaze sensor 60 toward the location of the user's face or eye 34. This location may be determined by processor 60 or by computer 26 on the basis of a depth map or on the basis of the skeleton reconstructed from the 3D map, as described above, or using methods of image-based face recognition that are known in the art. Scan control 62 may comprise, for example, an electromechanical gimbal, or a scanning optical or optoelectronic element, or any other suitable type of scanner that is known in the art, such as a microelectromechanical system (MEMS) based mirror that is configured to reflect the scene to gaze sensor 60.

In some embodiments, scan control 62 may also comprise an optical or electronic zoom, which adjusts the magnification of sensor 60 depending on the distance from device 24 to the user's head, as provided by the 3D map. The above techniques, implemented by scan control 62, enable a gaze sensor 60 of only moderate resolution to capture images of the user's eyes with high precision, and thus give precise gaze direction information.

In alternative embodiments, computer 26 may calculate the gaze angle using an angle (i.e., relative to Z-axis 44) of the scan control. In additional embodiments, computer 26 may compare scenery captured by the gaze sensor 60, and scenery identified in 3D depth maps. In further embodiments, computer may compare scenery captured by the gaze sensor 60 with scenery captured by a 2D camera having a wide field of view that includes the entire scene of interest. Additionally or alternatively, scan control 62 may comprise sensors (typically either optical or electrical) configured to verify an angle of the eye movement.

Processor 56 processes the images captured by gaze sensor 60 in order to extract the user's gaze angle. By combining the angular measurements made by sensor 60 with the 3D location of the user's head provided by depth imaging subassembly 52, the processor is able to derive accurately the user's true line of sight in 3D space. The combination of 3D mapping with gaze direction sensing reduces or eliminates the need for precise calibration and comparing multiple reflection signals in order to extract the true gaze direction. The line-of-sight information extracted by processor 56 enables computer 26 to identify reliably the interactive item at which the user is looking.

The combination of the two modalities can allow gaze detection without using an active projecting device (i.e., illumination subassembly 50) since there is no need for detecting a glint point (as used, for example, in the PCCR method). Using the combination can solve the glasses reflection problem of other gaze methods that are known in the art. Using information derived from natural light reflection, the 2D image (i.e. to detect the pupil position), and the 3D depth map (i.e., to identify the head's position by detecting the head's features), computer 26 can calculate the gaze angle and identify a given interactive item 36 at which the user is looking.

As noted earlier, gaze sensor 60 and processor 56 may track either one or both of the user's eyes. If both eyes 34 are tracked with sufficient accuracy, the processor may be able to provide an individual gaze angle measurement for each of the eyes. When the eyes are looking at a distant object, the gaze angles of both eyes will be parallel; but for nearby objects, the gaze angles will typically converge on a point in proximity to an object of interest. This point may be used, together with depth information, in extracting 3D coordinates of the point on which the user's gaze is fixed at any given moment.

As mentioned above, device 24 may create 3D maps of multiple users who are in its field of view at the same time. Gaze sensor 60 may similarly find the gaze direction of each of these users, either by providing a single high-resolution image of the entire field of view, or by scanning of scan control 62 to the location of the head of each user.

Processor 56 outputs the 3D maps and gaze information via a communication link 64, such as a Universal Serial Bus (USB) connection, to a suitable interface 66 of computer 26. The computer comprises a central processing unit (CPU) 68 with a memory 70 and a user interface 72, which drives display 28 and may include other components, as well. As noted above, device 24 may alternatively output only raw images, and the 3D map and gaze computations described above may be performed in software by CPU 68. Middleware for extracting higher-level information from the 3D maps and gaze information may run on processor 56, CPU 68, or both. CPU 68 runs one or more application programs, which drive user interface 72 based on information provided by the middleware, typically via an application program interface (API). Such applications may include, for example, games, entertainment, Web surfing, and/or office applications.

Although processor 56 and CPU 68 are shown in FIG. 2 as separate functional elements with a certain division of processing tasks between them, the functions of the processor and CPU may alternatively be carried out by a single processing unit, or these functions may be divided among three or more processing units. Furthermore, although device 24 is shown as containing a certain combination of components in a particular arrangement, other device configurations may be used for the purposes described herein, and are considered to be within the scope of the present invention.

Interaction with on-Screen Objects

Figure 3:
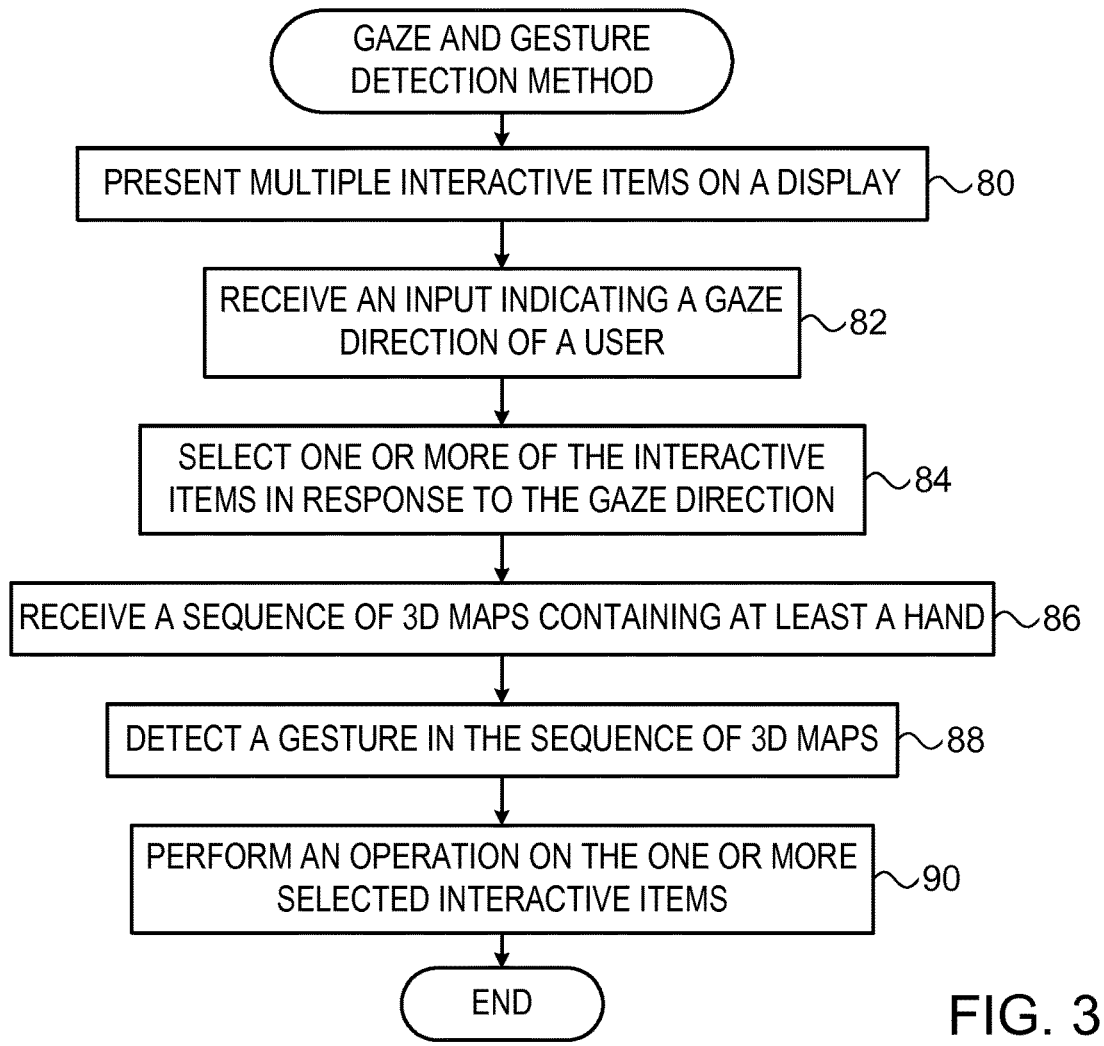
FIG. 3 is a flow diagram that schematically illustrates a method of detecting gazes and gestures, in accordance with an embodiment of the present invention.

FIG. 3 is a flow diagram that schematically illustrates a method of detecting gaze and gestures in order to select and perform an operation on a given interactive item 36, in accordance with an embodiment of the present invention. In a presentation step 80, computer 26 presents multiple interactive items 36 on display 28, and in a first receive step 82, the processor receives an input from sensing device 24 indicating a direction of a gaze performed by the user.

In some embodiments, receiving the input may comprise receiving, from depth imaging subassembly 52, a 3D map containing at least head 32, and receiving, from gaze sensor 60, a 2D image containing at least eye 34. Computer 26 can then analyze the received 3D depth map and the 2D image in order to identify a gaze direction of user 22. Gaze detection is described in PCT Patent Application PCT/IB2012/050577, filed Feb. 9, 2012, whose disclosure is incorporated herein by reference.

As described supra, illumination subassembly 50 may project a light toward user 22, and the received 2D image may comprise light reflected off the fundus and/or the cornea of eye(s) 34. In some embodiments, computer 26 can extract 3D coordinates of head 32 by identifying, from the 3D map, a position of the head along X-axis 40, Y-axis 42 and Z-axis 44. In alternative embodiments, computer 26 extracts the 3D coordinates of head 32 by identifying, from the 2D image a first position of the head along X-axis 40 and Y-axis 42, and identifying, from the 3D map, a second position of the head along Z-axis 44.

In a selection step 84, computer 26 identifies and selects a given interactive item 36 that the computer is presenting, on display 28, in the gaze direction. Subsequent to selecting the given interactive item, in a second receive step 86, computer 26 receives, from depth imaging subassembly 52, a sequence of 3D maps containing at least hand 31.

In an analysis step 88, computer 26 analyzes the 3D maps to identify a gesture performed by user 22. As described hereinbelow, examples of gestures include, but are not limited to a Press and Hold gesture, a Tap gesture, a Slide to Hold gesture, a Swipe gesture, a Select gesture, a Pinch gesture, a Swipe From Edge gesture, a Select gesture, a Grab gesture and a Rotate gesture. To identify the gesture, computer 26 can analyze the sequence of 3D maps to identify initial and subsequent positions of hand 31 (and/or fingers 30) while performing the gesture.

In a perform step 90, the computer performs an operation on the selected interactive item in response to the gesture, and the method ends. Examples of operations performed in response to a given gesture when a single item is selected include, but are not limited to:
- Presenting, on display 28, context information on the selected interactive item.
- Executing an application associated with the selected interactive item.
- Switching to an application associated with the selected interactive item (i.e., task switching).
- Changing, on display 28, the size of the selected interactive item.

In some embodiments user 22 can select the given interactive item using a gaze related pointing gesture. A gaze related pointing gesture typically comprises user 22 pointing finger 30 toward display 28 to select a given interactive item 36. As the user points finger 30 toward display 28, computer 26 can define a line segment between one of the user's eyes 34 (or a point between eyes 34) and the finger, and identify a target point where the line segment intersects the display. Computer 26 can then select a given interactive item 36 that is presented in proximity to the target point. Gaze related pointing gestures are described in PCT Patent Application PCT/IB2012/050577, filed Feb. 9, 2012, whose disclosure is incorporated herein by reference.

In additional embodiments, computer 26 can select the given interactive item 36 using gaze detection in response to a first input (as described supra in step 82), receive a second input, from touchpad 46, indicating a (tactile) gesture performed on the touchpad, and perform an operation in response to the second input received from the touchpad.

In further embodiments, user 22 can perform a given gesture while finger 30 is in contact with physical surface 47 (e.g., the desktop shown in FIG. 1), thereby "transforming" the physical surface into a virtual touchpad. In supplementary embodiments, as described hereinbelow, projector 48 can project an image on physical surface 47, thereby transforming the physical surface into a virtual touchscreen.

As described supra, embodiments of the present invention enable computer 26 to emulate touchpads and touchscreens by presenting interactive items 36 on display 28 and identifying three-dimensional non-tactile gestures performed by user 22. For example, computer 26 can configure the Windows 8™ operating system produced by Microsoft Corporation (Redmond, Wash.), to respond to three-dimensional gestures performed by user 22.

FIGS. 4A-4G are schematic pictorial illustrations of gestures that correspond to tactile gestures used when interacting with a computer executing the Windows 8™ operating system, in accordance with an embodiment of the present invention. In some embodiments, user 22 can perform the gestures described in FIG. 4 as two-dimensional gestures on touchpad 46. Additionally or alternatively, computer 26 may use inputs received from sensing device 24 to define a virtual surface (e.g., a virtual touchpad, a virtual touchscreen, a virtual keyboard or a virtual mouse) on physical surface 47, or in space in proximity to user 22. In operation, computer 26 can interpret three-dimensional gestures performed on the virtual surface as a corresponding two-dimensional gesture performed on touchpad 46 or touchscreen 28. While interacting with the virtual surface hand 31 typically "hovers" over the virtual surface until user 22 performs one of the gestures described hereinbelow.

Figure 4A:
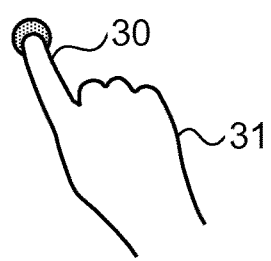
FIGS. 4A-4G, referred to collectively as FIG. 4, are schematic pictorial illustrations of gestures that can be used to interact with the computer system, in accordance with an embodiment of the present invention.

FIG. 4A is a schematic pictorial illustration of hand 31 performing the Press and Hold gesture, in accordance with an embodiment of the present invention. The Press and Hold gesture is similar to the Point Touch gesture described in PCT/IB2012/050577, referenced above, and comprises user 22 gazing toward a given interactive item 36, pushing finger 30 toward display 28 ("Press"), and holding the finger relatively steady for at least a specified time period ("Hold"). Upon identifying the gaze direction and the Press and Hold gesture, computer 26 can present context information on the selected interactive item 36.

As described supra, user 22 can select a given interactive item 36 using a gaze related pointing gesture, or perform a tactile gesture on gesture pad 46. To interact with computer 26 using a gaze related pointing gesture and the Press and Hold gesture, user 22 can push finger 30 toward a given interactive item 36 ("Press"), and hold the finger relatively steady for at least the specified time period ("Hold"). To interact with computer 26 using a gaze and gesture pad 46, user 22 can gaze toward a given interactive 36, touch gesture pad 46 with finger 30, and keep the finger on the gesture pad for at least the specified time period.

Figure 4B:
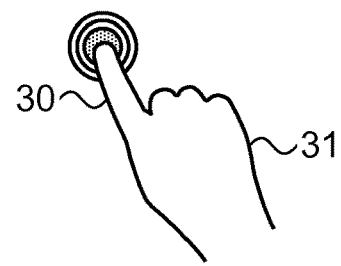

FIG. 4B is a schematic pictorial illustration of hand 31 performing the Tap gesture, in accordance with an embodiment of the present invention. The Tap gesture is similar to the Point Select gesture described in PCT/IB2012/050577, referenced above, and comprises user 22 gazing toward a given interactive item 36, pushing finger 30 toward display 28 ("Press"), and pulling the finger back ("Release"). Upon identifying the gaze direction and the Tap gesture, computer 26 can perform an operation associated with the given interactive item. For example, if the given interactive item comprises an application icon, the computer can execute an application associated with the application icon in response the Tap gesture.

To interact with computer 26 using a gaze related pointing gesture and the Tap gesture, user 22 can push finger 30 toward a given interactive item 36 ("Press"), and pull the finger back ("Release"). To interact with computer 26 using a gaze and gesture pad 46, user 22 can gaze toward a given interactive 36, touch gesture pad 46 with finger 30, and lift the finger off the gesture pad.

Figure 4C:
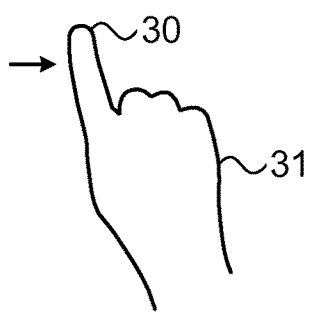

FIG. 4C is a schematic pictorial illustration of hand 31 performing the Slide to Drag gesture, in accordance with an embodiment of the present invention. The Slide to Drag gesture enables user 22 to scroll interactive items 36, thereby panning display 28. To perform the Slide to Drag gesture, user 22 gazes toward any part of display 28, pushes finger 30 toward the display ("Press"), moves the finger side-to-side in the direction of the requested scroll direction ("Drag"), and pulls the finger back ("Release"). Upon identifying a Slide to Drag gesture, computer 26 can "move the screen" by scrolling the interactive items on display 28 in the direction of the gesture. Therefore when gazing at display 28 and performing the Slide to Drag gesture, user 22 is in effect selecting and performing an operation on all the interactive items presented on the display.

In some embodiments, user 22 can control the direction of the scrolling by gazing left or right, wherein the gesture performed by finger 30 only indicates the scrolling action and not the scrolling direction. In additional embodiments, computer 26 can control the scrolling using real-world coordinates, where the computer measures the finger's motion in distance units such as centimeters and not in pixels. When using real-world coordinates, the computer can apply a constant or a variant factor to the detected movement. For example, the computer can translate one centimeter of finger motion to 10 pixels of scrolling on the display.

Alternatively, the computer may apply a formula with a constant or a variable factor that compensates a distance between the user and the display. For example, to compensate for the distance, computer 26 can calculate the formula $P=D*F$, where P=a number of pixels to scroll on display 28, D=a distance of user 22 from display 28 (in centimeters), and F=a factor.

There may be instances in which computer 26 identifies that user 22 is gazing in a first direction and moving finger 30 in a second direction. For example, user 22 may be directing his gaze from left to right, but moving finger 30 from right to left. In these instances, computer 26 can stop any scrolling due to the conflicting gestures. However, if the gaze and the Slide to Drag gesture performed by the finger indicate the same direction but different scrolling speeds (e.g., the user moves his eyes quickly to the side while moving finger 30 more slowly), the computer can apply an interpolation to the indicated scrolling speeds while scrolling the interactive items.

To interact with computer 26 using a gaze related pointing gesture and the Slide to Drag gesture, user 22 can push finger toward display 28 ("Press"), move the finger from side to side ("Drag"), and pull the finger back ("Release"). To interact with computer 26 using a gaze and gesture pad 46, user 22 can gaze toward display 28, touch gesture pad 46 with finger 30, move the finger side to side, and lift the finger off the gesture pad.

Figure 4D:
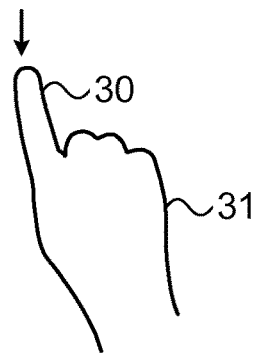

FIG. 4D is a schematic pictorial illustration of hand 31 performing the Swipe gesture, in accordance with an embodiment of the present invention. The Swipe gesture can be used for operations such as selecting an interactive item 36 sliding on display 28, or switching to another application executing on the computer (similar to the Alt-Tab keyboard combination in Microsoft Windows™). To perform the Swipe gesture, user 22 gazes towards a given interactive item 36 that is sliding on display 28, pushes finger 30 toward the display ("Push"), moves the finger at a 90° angle to the direction that the given interactive item is sliding ("Drag"), and pulls the finger back ("Release").

To interact with computer 26 using a gaze related pointing gesture and the Swipe gesture, user 22 can push finger 30 toward a given interactive item 36 ("Press"), move the finger at a 90° angle to the direction that the given interactive object is sliding ("Drag"), and pull the finger back ("Release"). To interact with computer 26 using a gaze and gesture pad 46, user 22 can gaze toward a given interactive 36, touch gesture pad 46 with finger 30, move the finger at a 90° angle to the direction that the given interactive object is sliding (e.g., up or down if the interactive items are sliding left or right) and lift the finger off the gesture pad.

In an alternative embodiment, user 22 can select an interactive item sliding on display 28 by performing the Select Gesture. To perform the Select gesture, user 22 gazes toward an interactive item 36 sliding on display 28 and swipe finger 30 in a downward motion (i.e., on the virtual surface). To interact with computer 26 using a gaze related pointing gesture and the Select gesture, user 22 can push finger 30 toward a given interactive item 36 sliding on display 28, and swipe the finger in a downward motion.

Figure 5:
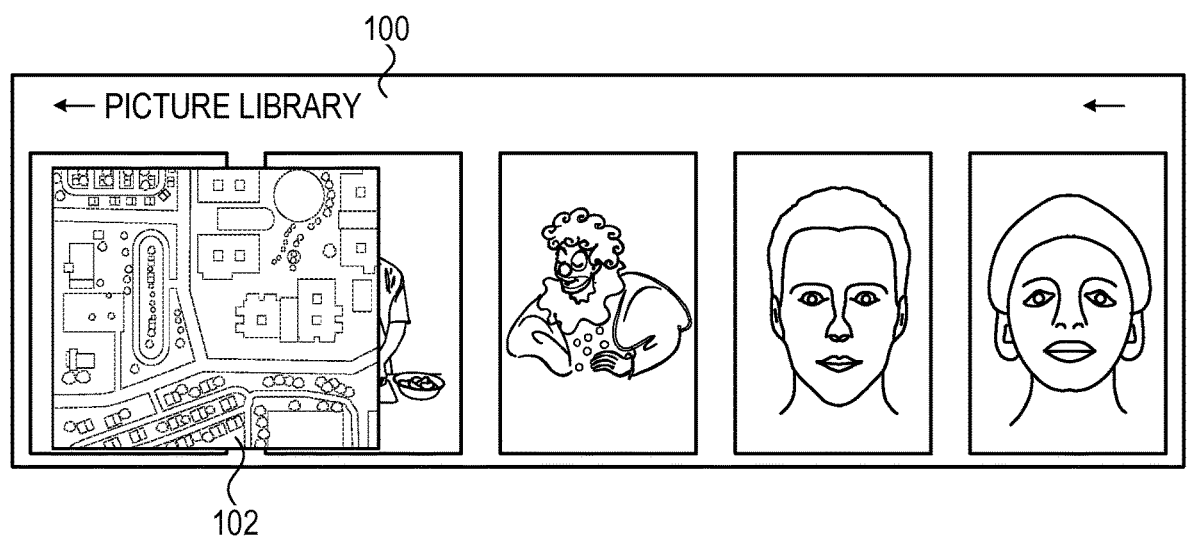
FIG. 5 is a schematic pictorial illustration of a pictures library application executing on the computer and presented on a display, in accordance with an embodiment of the present invention.

FIG. 5 is a schematic pictorial illustration of a pictures library application 100 executing on computer 26 and presented on display 28, and a map application 102 executing on the computer and "sliding" horizontally across the display. User 22 user can select the sliding map application 102 by performing the Swipe or Select gestures described supra.

Figure 4E:
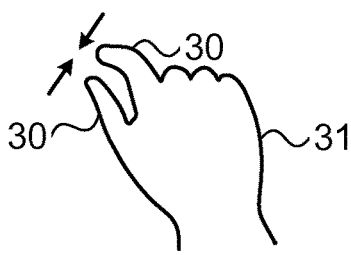

FIG. 4E is a schematic pictorial illustration of hand 31 performing the Pinch (to zoom) gesture, in accordance with an embodiment of the present invention. The Pinch gesture is similar to the Grab gesture described in U.S. patent application Ser. No. 13/423,314 filed on Mar. 19, 2012, whose disclosure is incorporated herein by reference. To perform the Pinch gesture, user 22 gazes toward a given interactive item 36, pushes two or more fingers 30 toward the display ("Press"), moves the fingers toward each other, e.g., pinching together an index and/or a middle finger with a thumb as shown in FIG. 4E ("Pinch"), and pulls the fingers back ("Release"). In response to the Pinch gesture, computer 26 can change the size (i.e., zoom) of the given interactive item presented on the display.

To interact with computer 26 using a gaze related pointing gesture and the Pinch gesture, user 22 can push two fingers 30 toward a given interactive item 36 ("Press"), move the fingers toward each other ("Pinch"), and pull the finger back ("Release"). To interact with computer 26 using a gaze and gesture pad 46, user 22 can gaze toward a given interactive 36, touch gesture pad 46 with two or more fingers 30, move the fingers towards or away from each other, and lift the finger off the gesture pad.

The Grab gesture has the same functionality as the Swipe gesture. To perform the Grab gesture, user 22 gazes toward a given interactive item 36, folds one or more fingers 30 toward the palm, either pushes hand 31 toward display 28 or pulls the hand back away from the display, and performs a Release gesture. To interact with computer 26 using a gaze related pointing gesture and the Grab gesture, user 22 can perform the Grab gesture toward a given interactive item 36, either push hand 31 toward display 28 or pull the hand back away from the display, and then perform a Release gesture. The Release gesture is described in U.S. patent application Ser. No. 13/423,314, referenced above.

Figure 4F:
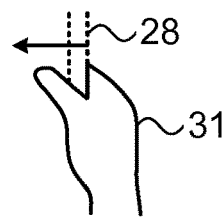
Figure 4G:
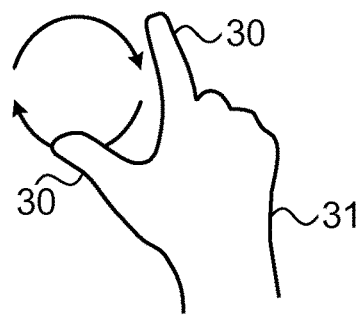

FIG. 4F is a schematic pictorial illustration of the Swipe From Edge gesture, in accordance with an embodiment of the present invention. In operation, the Swipe From Edge gesture enables user 22 to view hidden menus or to switch between applications executing on computer 26. To perform the Swipe from Edge gesture, user 22 gazes toward an (outer) edge of display 28 (i.e., top bottom, left or right), pushes finger 30 toward the display, and moves the finger "into" the display (i.e., away from the edge). Alternatively, user 22 can direct a gaze toward an edge of display 28, and perform the Swipe gesture by moving hand 31 in a horizontal swiping motion to the opposite side of the display. In embodiments described herein, "close to the edge" of the display can be set as a maximum distance from the edge of the display (e.g., 6 inches outside or from both sides of the edge).

To interact with computer 26 using a gaze related pointing gesture and the Swipe from Edge gesture, user 22 can push finger 30 toward an edge of display 28, and move the finger into the display. Alternatively, user 22 can perform the Swipe gesture away from an edge of display 28. To interact with computer 26 using a gaze and gesture pad 46, user 22 can gaze toward an edge of display 28, touch gesture pad 46, move the finger in a direction corresponding to moving into the display, and lift the finger off the gesture pad.

Upon identifying a Swipe From Edge gesture, computer 26 can perform an operation such as presenting a "hidden" menu on the "touched" edge.

Figure 6B:
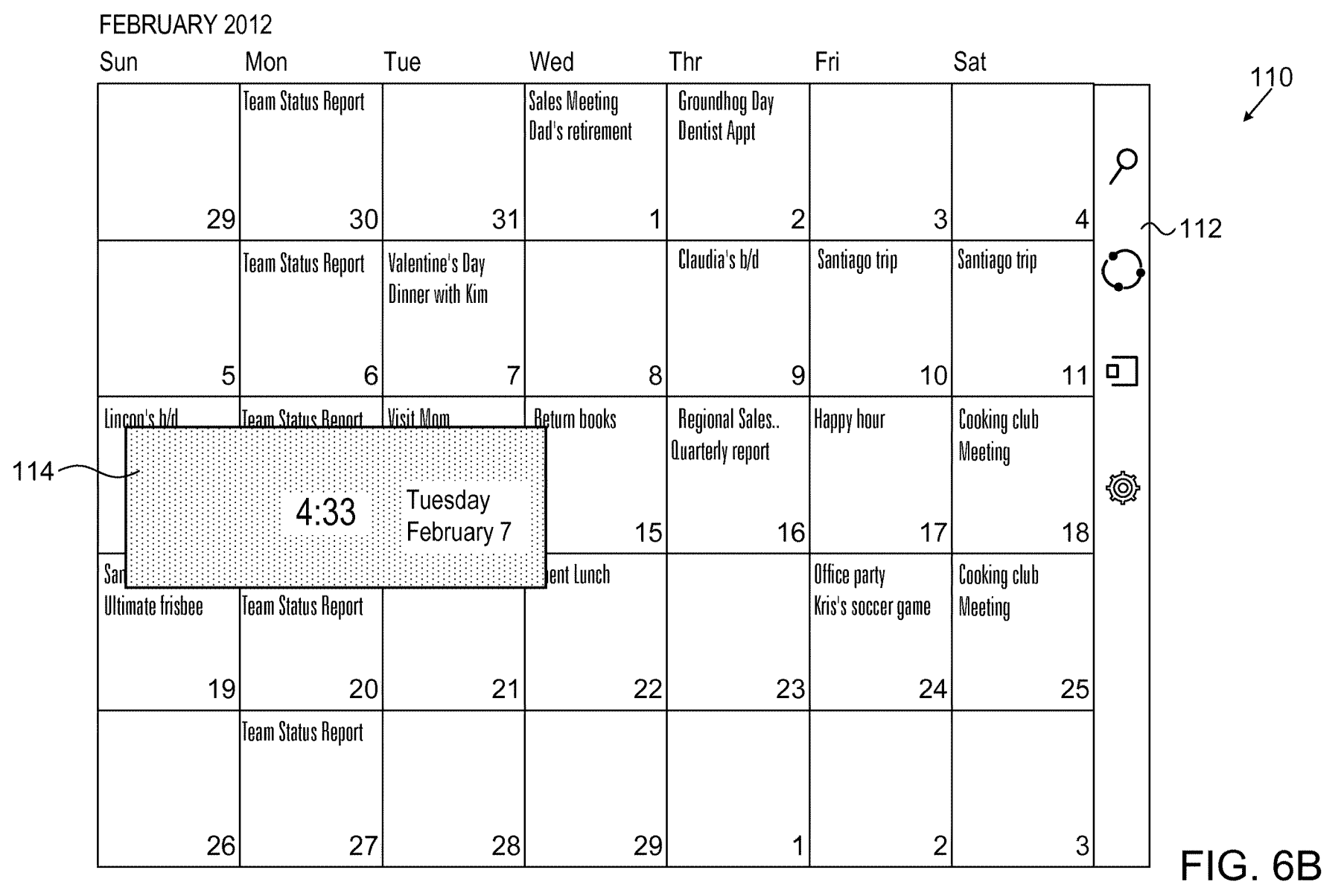

FIGS. 6A and 6B are schematic pictorial illustrations of a calendar application 110, in accordance with an embodiment of the present invention. Initially, computer 26 presents calendar application 110, as shown in FIG. 6A. Upon detecting user 22 performing a Swipe From Edge gesture starting from the right edge of the calendar, computer 26 presents a hidden menu 112 (also referred to as a "Charms" menu) on the right side of the calendar (as well as time and date information presented in a black box 114 positioned in the lower-left corner of the display), as shown in FIG. 7B. In some configurations, there may be a hidden menu 112 for each side of the screen (i.e., left, right, up, down).

In additional embodiments, computer 26 can present the hidden menu solely on identifying the user's gaze directed at the specific edge (the right edge in the example shown in FIGS. 6A and 6B), and not require any gesture to be performed by finger 30.

FIG. 4F is a schematic pictorial illustration of the Rotate gesture, in accordance with an embodiment of the present invention. The Rotate gesture enables user 22 to rotate and thereby control a given interactive item 36. For example, the selected interactive item 36 may comprise a volume knob that user 22 can control by rotating the knob clockwise or counterclockwise. The Rotate gesture is described in U.S. patent application Ser. No. 13/423,314, referenced above.

To perform the Rotate gesture, user 22 gazes toward a given interactive item 36 presented on display 28, pushes two or more fingers 30 toward the display ("Press"), rotates the fingers in a circular (i.e., clockwise/counterclockwise) motion ("Rotate"), and pulls the fingers back ("Release"). In some embodiments, computer 26 may allow the user to pinch together two or more fingers 30 from different hands 31 while performing the Rotate gesture.

To interact with computer 26 using a gaze related pointing gesture and the Rotate gesture, user 22 can push two or more fingers 30 toward a given interactive item 36 ("Press"), rotate the fingers ("Rotate"), and pull the finger back ("Release"). To interact with computer 26 using a gaze and gesture pad 46, user 22 can gaze toward a given interactive 36, touch gesture pad 46 with two or more fingers 30, move the fingers in a circular motion on the gesture pad, and lift the finger off the gesture pad.

In addition to manipulating interactive items 36 via the virtual surface, user 22 may also interact with other types of items presented on display 28, such as an on-screen virtual keyboard as described hereinbelow.

Figure 7A:
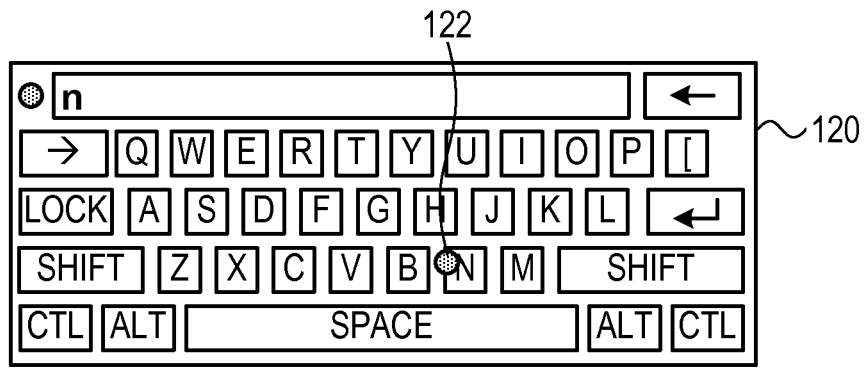
FIGS. 7A and 7B are schematic pictorial illustrations of a virtual keyboard presented on the display, in accordance with an embodiment of the present invention.
Figure 7B:
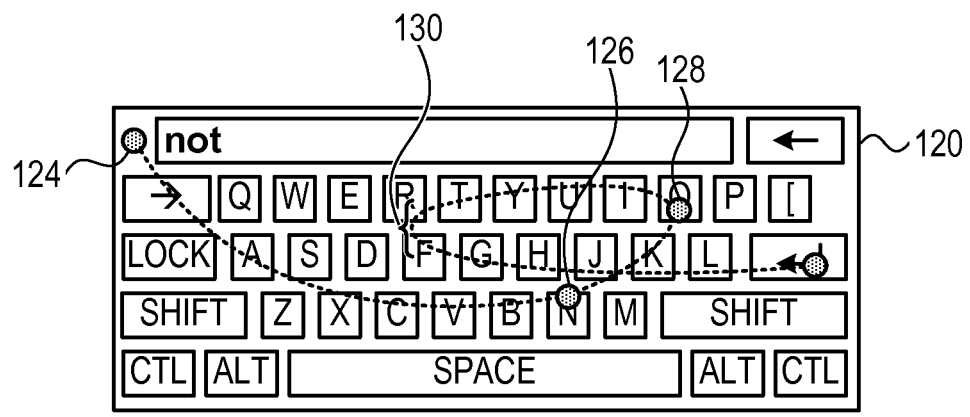

FIG. 7A is a first schematic pictorial illustration of a virtual keyboard 120, in accordance with an embodiment of the present invention. In the example shown in FIG. 7A, user 22 interacts with a virtual keyboard 120 via a cursor 122 that computer 26 positions on display 28 in response to the motion of hand 31 and/or finger 30. Virtual keyboard 120 is described in U.S. patent application Ser. No. 13/244,490, filed Sep. 25, 2011, whose disclosure is incorporated herein by reference.

In some embodiments, computer 62 may present interactive items 36 (i.e., the virtual surface) and keyboard 120 simultaneously on display 28. Computer 26 can differentiate between gestures directed toward the virtual surface and the keyboard as follows:

- A Tap gesture directed outside keyboard 120 can be associated with the virtual surface (i.e., a virtual touchpad or a virtual touchscreen).
- Any gesture by two or more connected fingers 30 directed within keyboard 120 can be interpreted as a virtual touchpad gesture.
- Single finger gestures directed within keyboard 120 can be interpreted as keys being pressed on the virtual keyboard.

In addition to pressing single keys with a single finger, the computer can identify, using a language model, words that the user can input by swiping a single finger over the appropriate keys on the virtual keyboard.

FIG. 7B is a second schematic pictorial illustration of virtual keyboard 120, in accordance with an embodiment of the present invention. In the example shown in FIG. 7B, user 22 first moves finger 30 to position cursor 122 at a position 124, and moves finger 30, along the path segments shown, so that the cursor changes direction at a position 126 (by the letter "N"), a position 128 ("O") and a position 130 ("T"). Interpreting letters input via path segments on the virtual keyboard is described in U.S. patent application Ser. No. 13/244,490, referenced above.

Additional features that can be included in the virtual surface, using the depth maps and/or color images provided by device 24, for example, include:

- Finger Detection. Computer 26 can identify which one or more fingers 30 on which hand 31 are interacting with the virtual surface. Different gestures can be defined for different fingers and/or hands.
- Color Aware Touchscreen. Computer 26 can identify a color of an object held by hand 31, and use the identified color in an application. For example, if computer 26 is executing a paint program, and user 22 picks up a colored pen (not shown), then the computer can recognize the color of the pen and use that color when presenting content "drawn" by the user on the virtual surface.

Hand-aware virtual surface. Computer 26 can determine which hand (left/right) 30 is touching the virtual surface.

User-aware virtual surface. Computer 26 can determine an identity of a given user 22 who is touching and interacting with the virtual surface.

Head orientation-aware user interface. When a gaze related pointing gesture is used to control the virtual surface, computer 26 can change the user interface as a function of head movement.

User-position aware user interface. Computer 26 can change the user interface as a function of user position, distance, and/or pose. For example, when the user moves closer to sensing device 24, computer 26 can present interactive items 36 using a smaller size. Likewise, when the user moves further from sensing device 24, computer 26 can present interactive items 36 using a larger size. If user 22 shifts horizontally, computer 26 can rearrange the interactive items presented on display 26 to enable better interactivity.

While the embodiments described herein have computer 26 processing a series of 3D maps that indicate gestures performed by a limb of user 22 (e.g., finger 30 or hand 31), other methods of gesture recognition are considered to be within the spirit and scope of the present invention. For example, user 22 may use input devices such as lasers that include motion sensors, such as a glove controller or a game controller such as Nintendo's Wii Remote™ (also known as a Wiimote), produced by Nintendo Co., Ltd (KYOTO-SHI, KYT 601-8501, Japan). Additionally or alternatively, computer 26 may receive and process signals indicating a gesture performed by the user from other types of sensing devices such as ultrasonic sensors and/or lasers.

Gaze-Based Touchscreen Enhancement

As described supra, embodiments of the present invention can be used to implement a virtual touchscreen on computer 26 executing user interface 20. In some embodiments, the touchpad gestures described hereinabove (as well as the pointing gesture and gaze detection) can be implemented on the virtual touchscreen as well. In operation, the user's hand "hovers above" the virtual touchscreen until the user performs one of the gestures described herein.

For example, the user can perform the Swipe From Edge gesture in order to view hidden menus (also referred to as "Charms Menus") or the Pinch gesture can be used to "grab" a given interactive item 36 presented on the virtual touchscreen.

Physical Surface Enhancement

In addition to detecting three-dimensional gestures performed by user 22 in space, computer 26 can be configured to detect user 22 performing two-dimensional gestures on physical surface 47, thereby transforming the physical surface into a virtual tactile input device such as a virtual keyboard, a virtual mouse, a virtual touchpad or a virtual touchscreen.

In some embodiments, the 2D image received from sensing device 24 contains at least physical surface 47, and the computer 26 can be configured to segment the physical surface into one or more physical regions. In operation, computer 26 can assign a functionality to each of the one or more physical regions, each of the functionalities corresponding to a tactile input device, and upon receiving a sequence of three-dimensional maps containing at least hand 31 positioned on one of the physical regions, the computer can analyze the 3D maps to detect a gesture performed by the user, and simulate, based on the gesture, an input for the tactile input device corresponding to the one of the physical regions.

FIGS. 8A-8D, referred to collectively as FIG. 8, are schematic pictorial illustrations of a physical regions 142 and 144 on physical surface 47, in accordance with an embodiment of the present invention. In the example shown in FIG. 8, computer 26 configures region 142 as a virtual touchscreen, and configures region 144 as a virtual mouse.

Figure 8A:
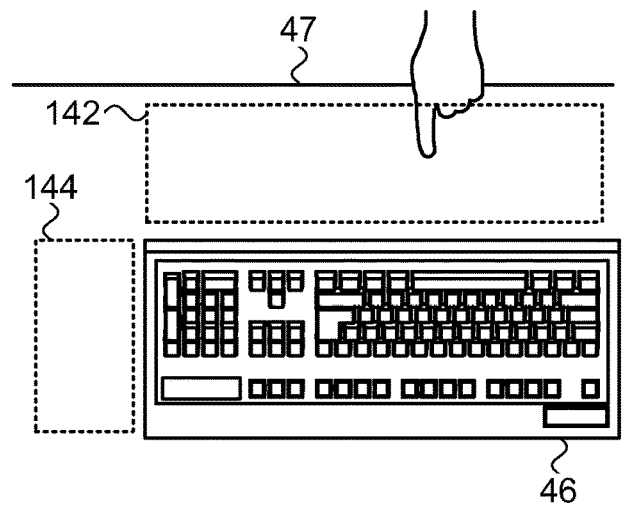
FIGS. 8A-8D, referred to collectively as FIG. 8, are schematic pictorial illustrations of physical regions on a physical surface, in accordance with an embodiment of the present invention.

In FIG. 8A, computer 26 uses information provided by 3D sensing device 24 to detect the location of the user's hand and any fingers 30 that are touching the region 142. Each point within region 142 (and physical surface 47) can be mapped to a corresponding point on display 28. Although the example in FIG. 8A shows a single finger 30 in contact with region 142, the 3D sensing device and computer 26 are can be configured to detect any number of fingers 30, thereby enabling user 22 to perform complex, multi-finger control gestures, including scrolling, zoom, pan, and so forth. In some embodiments, computer 26 can configure region 142 as a virtual keyboard able to accept "input" from all fingers 30.

Figure 8B:
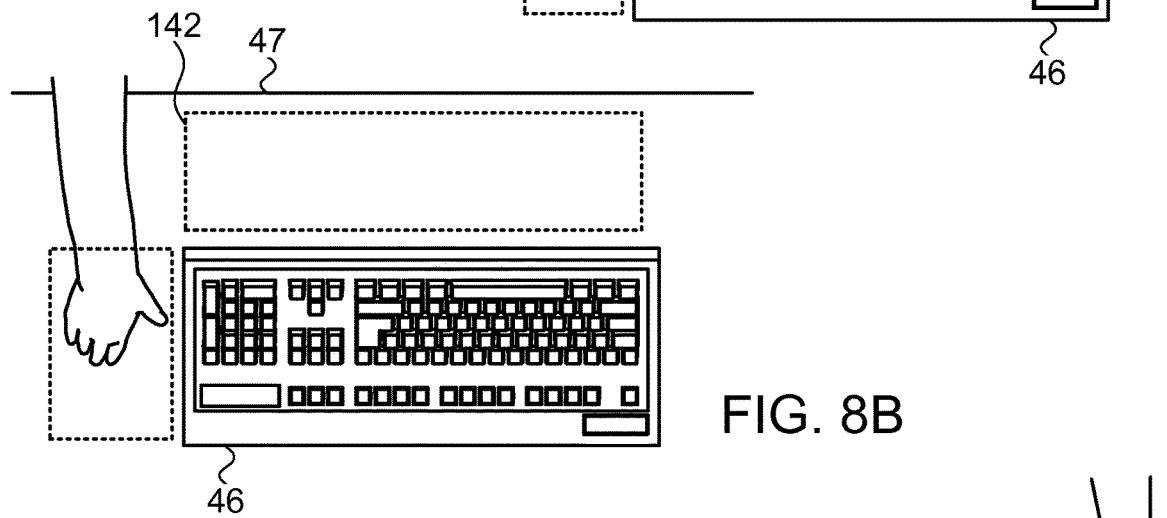

FIG. 8B, shows the use of the region 144 to the right of the keyboard as a mouse region. Here the user's hand is assumed to hold a mouse (actual or non-existent). In operation, computer 26 can reposition a cursor on display 28 responsively to the movement of the user's hand in region 144. Motions (such as tapping motions) of the user's fingers, as detected by the 3D sensing device, can be interpreted by the computer as clicks on mouse buttons, with each finger 30 assigned to correspond to a different button.

Figure 8C:
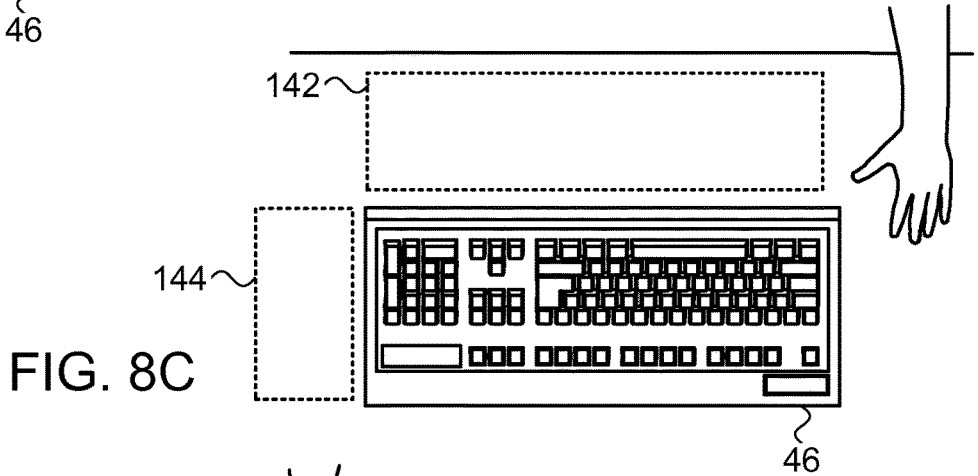
Figure 8D:
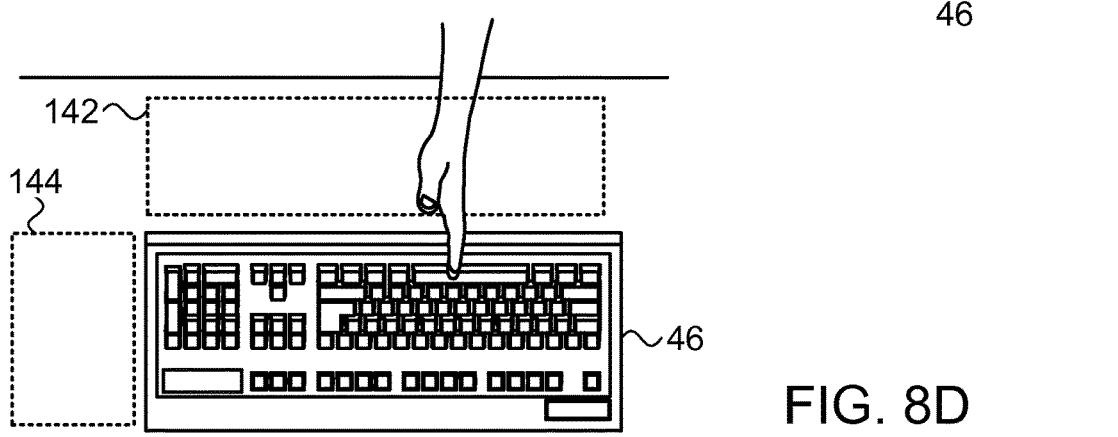

FIG. 8C shows the use of the left hand to select "charms" in the area to the left of the keyboard, and FIG. 8D shows the use of the space above the keyboard as an interaction region, for 3D gestures that do not necessarily involve contact with physical surface 47.

Figure 9A:
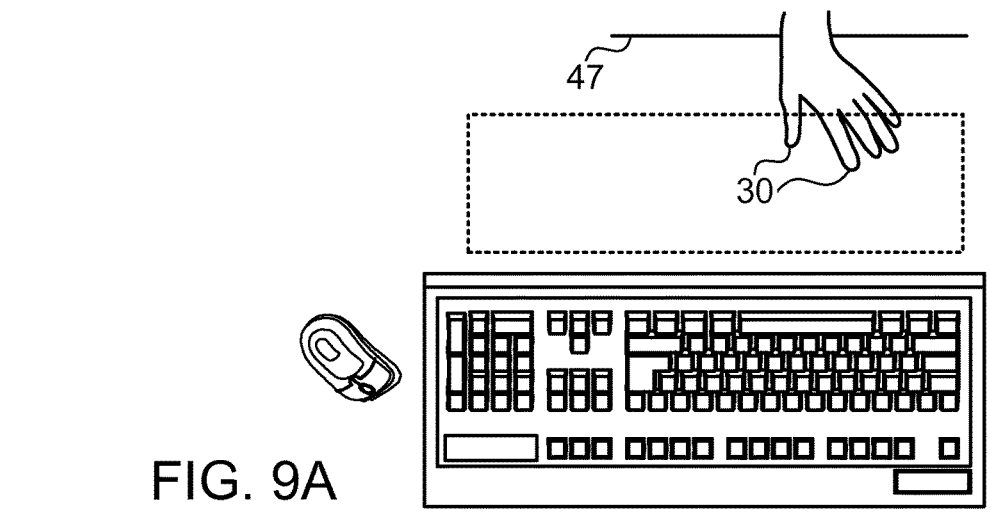
FIGS. 9A-9C, referred to collectively as FIG. 9, are schematic pictorial illustrations showing how movement of a user's hand on or near the physical surface can provide "inertial" input to the computer.
Figure 9B:
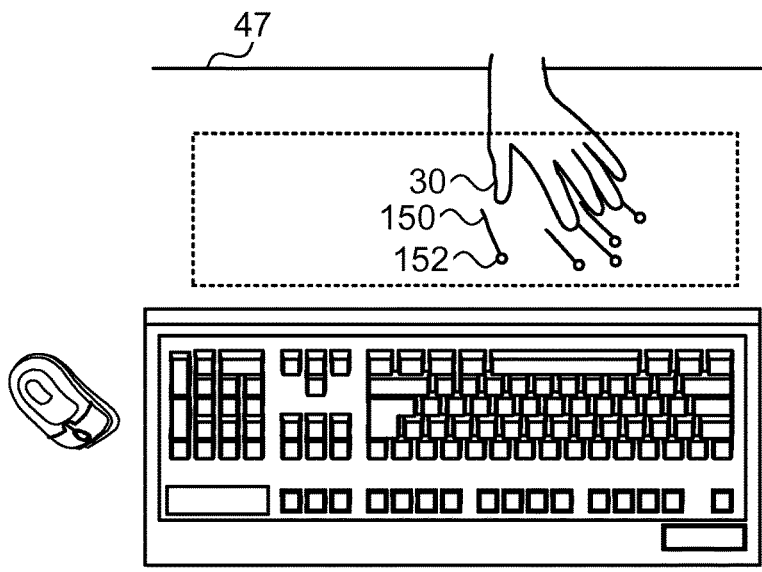
Figure 9C:
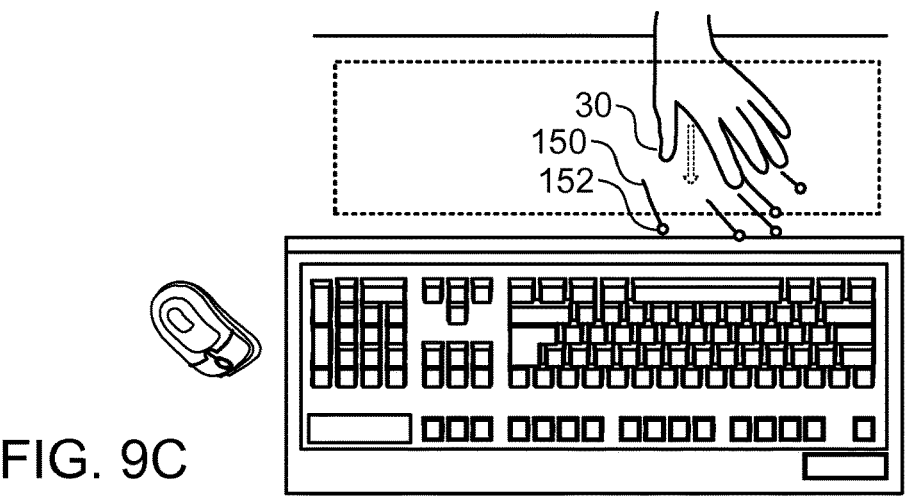

FIGS. 9A-9C, referred to collectively as FIG. 9, are schematic pictorial illustrations showing how a movement of hand 31 on or near the physical surface can provide "inertial" input to the computer, in accordance with an embodiment of the present invention. Based on input from the 3D sensing device (i.e., the sequence of 3D maps), the computer can determine both the position and the velocity of each of the user's fingers, as illustrated by lines 150 and points 152 superimposed on physical surface 47 in the left side of FIGS. 9B and 9C. The computer can incorporate the position and the velocity information into the simulated input for controlling the direction and speed of movement of one or more interactive items 36 presented on the display.

FIGS. 10A-10D, referred to collectively as FIG. 10 are schematic pictorial illustrations of physical surface 47 configured as an input device for a drawing application, in accordance with an embodiment of the present invention. IN operation, computer 26 can form the drawing in an off-screen buffer by transforming the user's interaction into drawing commands in that buffer, using a defined coordinate transformation between touch coordinates on the physical surface and pixel coordinates in the drawing buffer.

In the example shown in FIG. 10, lines 160 comprise historical positions of fingers 30 as user 22 "paints" a picture. As shown in FIG. 10A, computer 26 can configure physical surface 47 as a multi-touch input device configured to accept input from one or more fingers 30.

Figure 10A:
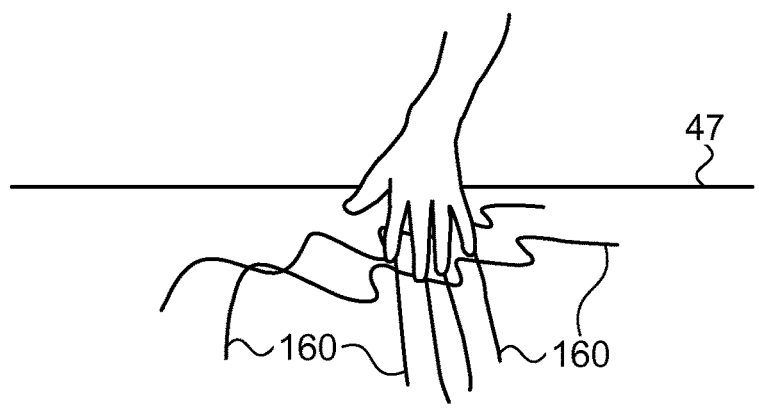
FIGS. 10A-10D, referred to collectively as FIG. 10 are schematic pictorial illustrations of the physical surface configured as an input device for a drawing application, in accordance with an embodiment of the present invention.
Figure 10B:
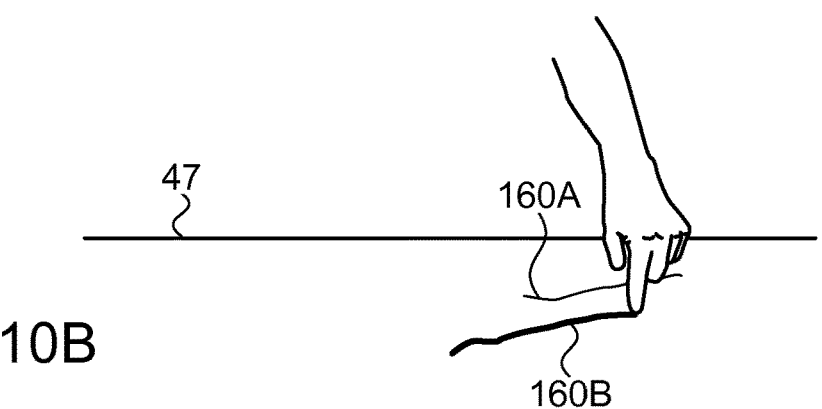

FIG. 10B illustrate that the thickness of the drawn line may be controlled by how the user presses finger 30 on physical surface 47. Computer 26 can execute an algorithm to detect, using the sequence of 3D maps, where the user touches the physical surface and to compute how many pixels of the finger are close to the physical surface (for example, how many pixels are within proximity of 1 cm from the surface). By changing the finger's proximity to the physical surface, or the angle at which it is held, the user can generate a virtual "pressure" against the physical surface, which computer 26 can incorporate into the simulated input for determining the line's thickness. In the example shown in FIG. 10B line 160B is thicker than line 160A due the increased pressure applied by finger 30 when line 160B was drawn.

Figure 10C:
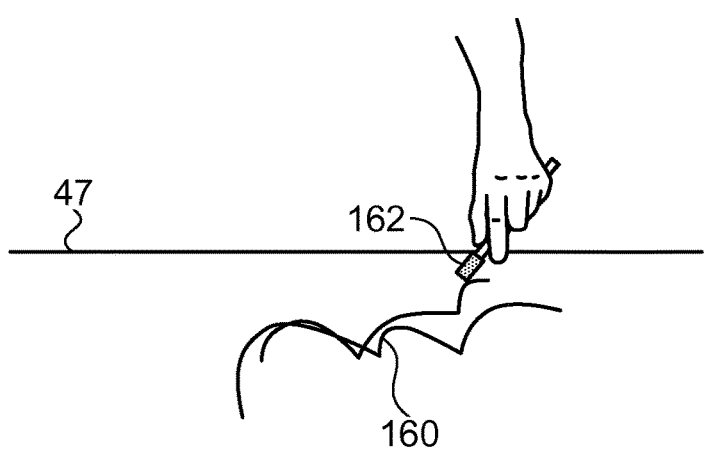

FIG. 10C illustrates color awareness that may be incorporated into this drawing application. The user holds an object such as a pen 162 (or a marker with the cap closed) in hand 31, and the 2D image received from the color video camera in device 24 can detect the color of the pen and computer 26 can incorporate this same color into the simulated input for use when presenting the currently drawn line.

Therefore, user 22 can pick up an object (e.g., a colored pen, as described supra), and perform a gesture while holding the object. In some embodiments, the received sequence of 3D maps contain at least the object, since hand 31 may not be within the field of view of sensing device 24. Alternatively, hand 31 may be within the field of view of sensing device 24, but the hand may be occluded so that the sequence of 3D maps does not include the hand. In other words, the sequence of 3D maps can indicate a gesture performed by the object held by hand 31. All the features of the embodiments described above may likewise be implemented, mutatis mutandis, on the basis of sensing movements of a handheld object of this sort, rather than of the hand itself.

Figure 10D:
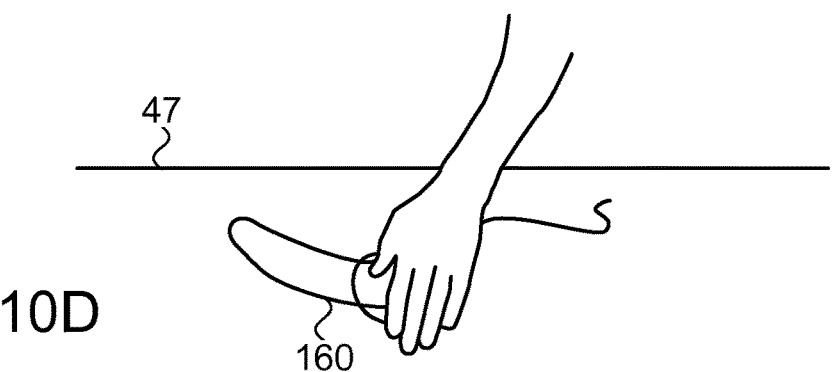

FIG. 10D illustrates a possible eraser mode, whereby the user 22 rubs hand 31 over the physical surface, and this gesture causes computer 26 to erase the relevant regions of the drawing in the drawing buffer. One possibility for entering "eraser" mode is to detect that the user has placed his or her palm on the physical surface, rather than individual fingers (which would indicate "drawing" mode). Another option is to allow the user to explicitly enter "eraser" mode using a separate gesture.

In order to enrich the set of interactions available to user 22 in this paint application, it is also possible to add menus and other user interface elements as part of the application's usage.

Figure 11:
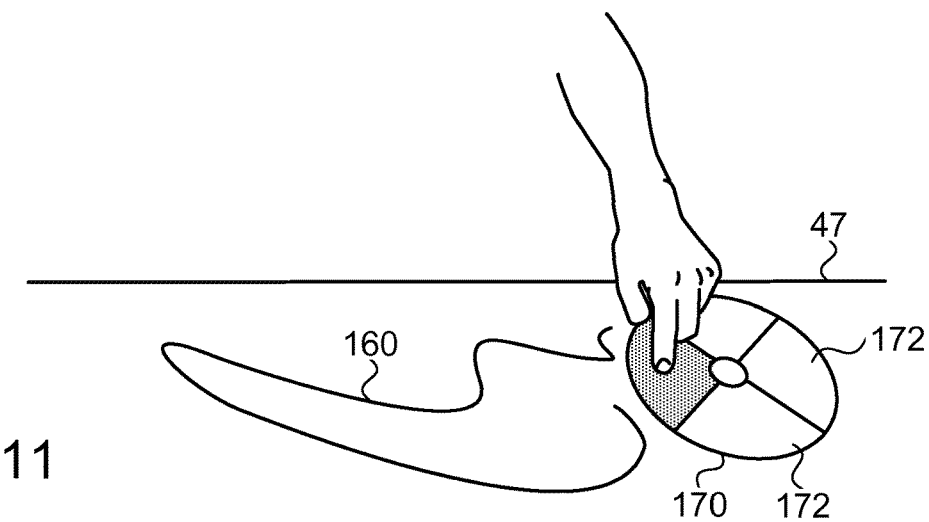
FIG. 11 is a schematic pictorial illustration showing how a "pie menu" may be incorporated into the drawing application.

FIG. 11 is a schematic pictorial illustration showing how a "pie menu" 170 may be incorporated into the application. The pie menu illustrated has 4 sectors 172, each corresponding to a different option. In general, the number of sectors can be varied. User 22 can activate pie menu 170 by pressing finger 30 on physical surface 47, and keeping the finger still for a short timeout period. This timeout enables the system to distinguish between a drawing interaction (in which case the user will very quickly start to move the finger after placing it on the physical surface), and user interface interaction (in which case the user keeps the finger still for this timeout). User 22 may select a given sector 172 from the pie menu in one of two ways: One way to perform a selection is to drag finger 30 into the desired sector 172 (during which time the sector will be highlighted in yellow), and raise the finger from the physical surface to confirm the selection. Another way is to swipe finger 30 across the desired sector 172 (from the center of the pie menu, out beyond the outer radius of the pie menu). In this latter case, the selection is performed as soon as the finger exits the pie menu's outer radius, with no need to raise the finger from the table.

Figure 12A:
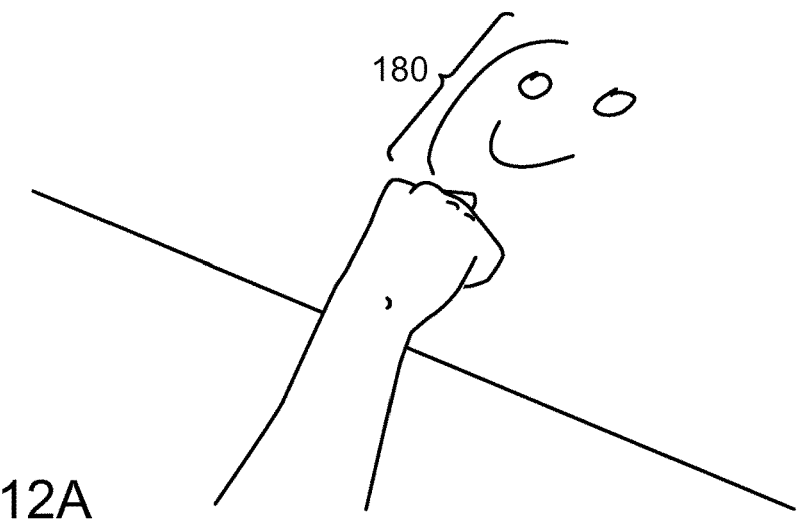
FIGS. 12A and 12B, referred to collectively as FIG. 12, are schematic pictorial illustrations of the physical surface illuminated by a projector, in accordance with an embodiment of the present invention.
Figure 12B:
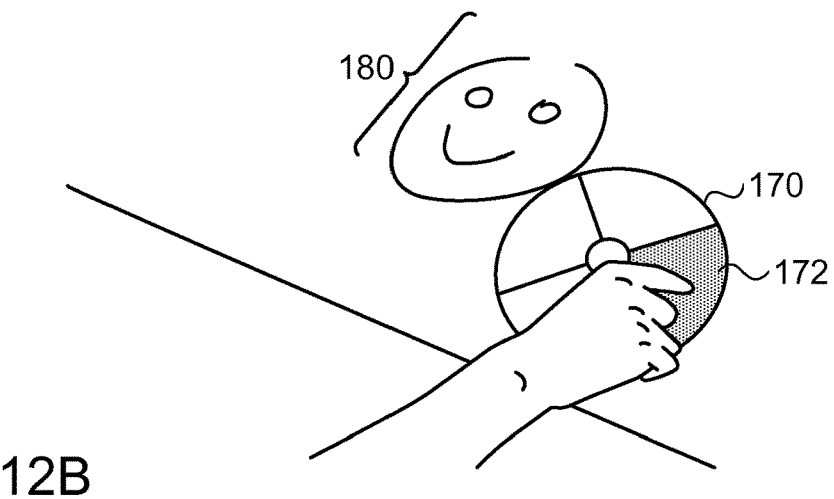

FIGS. 12A and 12B, referred to collectively as FIG. 12, are schematic pictorial illustrations of physical surface 47 illuminated by projector 48, in accordance with an embodiment of the present invention. To enrich the user's experience, projector 48 may be added to the configuration, typically above the physical surface, to physically project a drawing on the physical surface, thereby simulating a touch-screen on physical surface 47. FIG. 12A shows a hand 31 drawing on the physical surface, while projector 48 projects this virtual drawing 180 onto the physical surface. This projection gives users a more immersive experience in that they do not need to look at the computer monitor to see the intermediate results of their drawing. Projector 48 can also project pie menu 170 onto physical surface 47, as seen in FIG. 12B.

In some embodiments, one or more physical objects can be positioned on physical surface 47, and upon computer 26 receiving, from sensing device 24, a sequence of three-dimensional maps containing at least the physical surface, the one or more physical objects, and hand 31 positioned in proximity to (or on) physical surface 47, the computer can analyze the 3D maps to detect a gesture performed by the user, project an animation onto the physical surface in response to the gesture, and incorporate the one or more physical objects into the animation.

In operation, 3D maps captured from depth imaging subassembly 52 can be used to identify each physical object's location and shape, while 2D images captured from sensor 60 can contain additional appearance data for each of the physical objects. The captured 3D maps and 2D images can be used to identify each of the physical objects from a pre-trained set of physical objects. An example described in FIG. 13 hereinbelow incorporates the physical objects into a game application where animated balls are projected onto physical surface 47 in response to user 22 swiping fingers 30 on the physical surface. In operation, the animated balls can "collide" with the physical objects by detecting the locations of the physical objects, and instantiating virtual collision objects co-located with the physical objects.

FIGS. 13A-13D, referred to collectively as FIG. 13, are schematic pictorial illustrations showing one or more physical objects 190 positioned on physical surface 47 while user 22 performs a gesture, in accordance with an embodiment of the present invention. In some embodiments, projector 48 can project, onto physical surface 47, a respective contour image 192 encompassing each of the one or more physical objects, thereby indicating a location of each of the one or more physical objects.

Figure 13A:
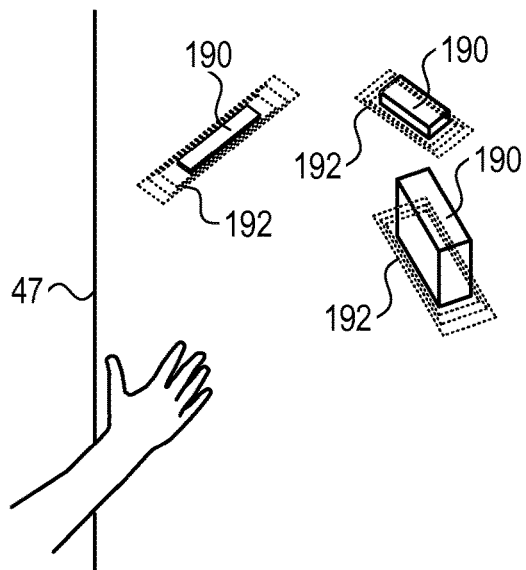
FIGS. 13A-13D, referred to collectively as FIG. 13, are schematic pictorial illustrations of the computer system incorporating, into an animation projected onto the physical surface, one or more physical objects positioned on the physical surface.
Figure 13B:
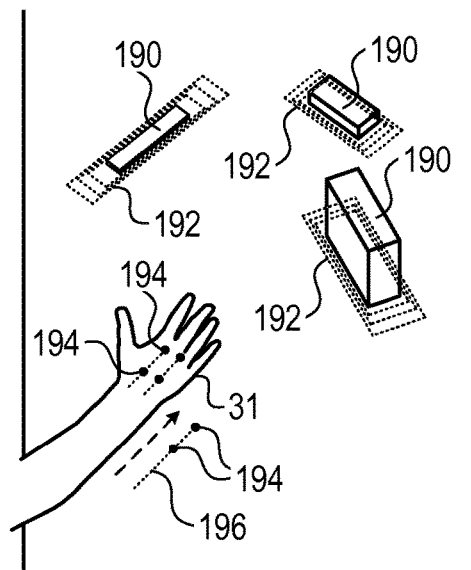

In FIG. 13A, user 22 is resting hand 31 on physical surface 47 and in FIG. 13B, the user 22 starts performing a gesture by moving the hand toward a given one of physical objects 190. In response to the user's gesture, computer 26 can project, onto hand 31 and/or surface 47, an animation comprising multiple balls 194 with respective trailing paths 196, the respective trailing paths indicating recent historical positions of the balls.

Figure 13C:
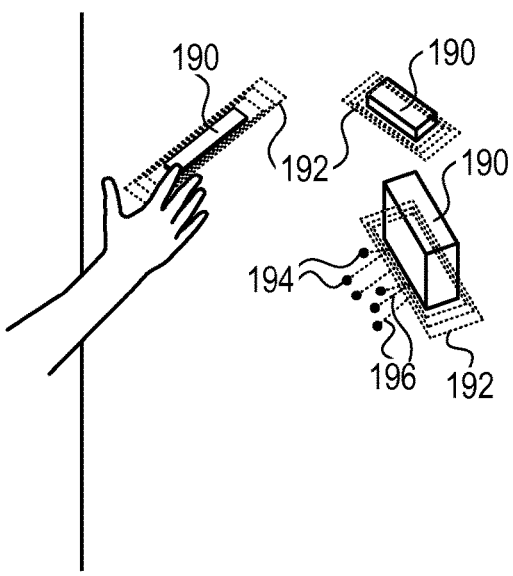
Figure 13D:
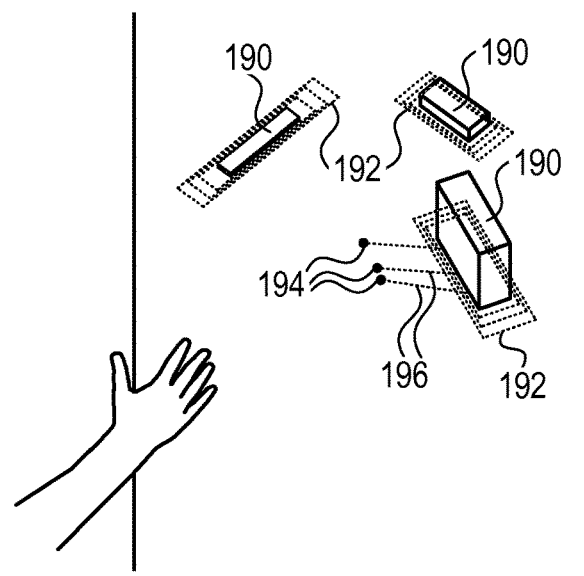

In FIGS. 13B and 13C, upon user 22 completing the gesture, computer 26 projects the animation comprising balls 194 and their respective trailing paths 196 colliding with and reflecting off of the contour image for the given physical object, thereby incorporating the respective contour image into the animation. While the example in FIG. 13 shows the animation projected onto physical surface 47, presenting the animation on display 28 is considered to be within the spirit and scope of the present invention.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An apparatus, comprising:
a sensing device configured to receive a two dimensional (2D) image containing at least a physical surface, and to receive a sequence of three dimensional (3D) maps containing at least a hand of a user, the hand positioned on the physical surface;
a display; and
a computer coupled to the sensing device and the display, and configured to segment the physical surface into one or more physical regions, to assign a functionality to each of the one or more physical regions, such that one of the physical regions on the physical surface has the functionality of a touchpad or touchscreen, to analyze the 3D maps to detect a gesture performed by the user with the hand positioned on the one of the physical regions that has the functionality of the touchpad or touchscreen, and to simulate, based on the gesture, an input from the touchpad or touchscreen.

2. The apparatus according to claim 1, and comprising a projector coupled to the computer and configured to project an image on the physical surface in response to the gesture.

3. The apparatus according to claim 1, wherein the computer is configured to determine, based the sequence of 3D maps, a pressure applied by one or more fingers of the hand against the physical surface, and to incorporate the pressure into the simulated input.

4. The apparatus according to claim 1, wherein the computer is configured to identify, based on the 2D image, a color of an object held by the hand and in contact with the physical surface, and to incorporate the color into the simulated input.

5. The apparatus according to claim 1, wherein the computer is configured to determine, based on the sequence of 3D maps, a position and a velocity of one or more fingers of the hand, and to incorporate the position and the velocity into the simulated input.

6. A computer software product comprising a non-transitory computer-readable medium, in which program instructions are stored, which instructions, when read by a computer, cause the computer to receive a two-dimensional image (2D) containing at least a physical surface, to segment the physical surface into one or more physical regions, to assign a functionality to each of the one or more physical regions, such that one of the physical regions on the physical surface has the functionality of a touchpad or touchscreen, to analyze the 3D maps to detect a gesture performed by the user with the hand positioned on the one of the physical regions that has the functionality of the touchpad or touchscreen, and to simulate, based on the gesture, an input from the touchpad or touchscreen.

7. A method, comprising:
Receiving, in a computer, a sequence of three-dimensional (3D) maps containing at least a physical surface, one or more physical objects positioned on the physical surface, and a hand of a user of the computer, the hand positioned in proximity to the physical surface;
analyzing the 3D maps to detect a gesture performed by the user;
projecting, onto the physical surface, a respective contour image encompassing each of the one or more physical objects;
projecting, onto the physical surface, an animation in response to the gesture; and
incorporating the respective contour image encompassing the one or more physical objects into the animation.

8. An apparatus, comprising:
a sensing device configured to receive a sequence of three dimensional (3D) maps containing at least a physical surface, one or more physical objects positioned on the physical surface, and a hand of a user, the hand positioned in proximity to the physical surface;
a projector; and
a computer coupled to the sensing device and the projector, and configured to analyze the 3D maps to detect a gesture performed by the user, to present on the physical surface, using the projector, a respective contour image encompassing each of the one or more physical objects and an animation, in response to the gesture, incorporating the respective contour image encompassing the one or more physical objects.

9. A computer software product comprising a non-transitory computer-readable medium, in which program instructions are stored, which instructions, when read by a computer, cause the computer to receive a sequence of three-dimensional (3D) maps containing at least a physical surface, one or more physical objects positioned on the physical surface, and a hand of a user of the computer, the hand positioned in proximity to the physical surface, to analyze the 3D maps to detect a gesture performed by the user, to project, onto the physical surface, a respective contour image encompassing each of the one or more physical objects and an animation in response to the gesture, and to incorporate the respective contour image encompassing the one or more physical objects into the animation.

10. A method, comprising:
receiving, by a computer, a two-dimensional image (2D' containing at least a physical surface;
segmenting the physical surface into one or more physical regions;
assigning a functionality to each of the one or more physical regions, such that one of the physical regions on the physical surface has the functionality of a touchpad or touchscreen;
receiving a sequence of three-dimensional (3D) maps containing at least a hand of a user of the computer, with the hand positioned on the one of the physical regions that has the functionality of the touchpad or touchscreen;
analyzing the 3D maps to detect a gesture performed by the user on the one of the physical regions that has the functionality of the touchpad or touchscreen; and
simulating, based on the gesture, an input from the touchpad or touchscreen wherein simulating the input comprises drawing a line in response to a first gesture performed by the hand on the physical surface, and erasing the line in response to a second gesture performed by the hand on the physical surface.

11. A method, comprising:
receiving, by a computer, a two-dimensional image (2D) containing at least a physical surface;
segmenting the physical surface into one or more physical regions;

assigning a functionality to each of the one or more physical regions, such that one of the physical regions on the physical surface has the functionality of a touchpad or touchscreen;

receiving a sequence of three-dimensional (3D) maps containing at least a hand of a user of the computer, with the hand positioned on the one of the physical regions that has the functionality of the touchpad or touchscreen;

analyzing the 3D maps to detect a gesture performed by the user on the one of the physical regions that has the functionality of the touchpad or touchscreen; and simulating, based on the gesture, an input from the touchpad or touchscreen; and comprising determining, based the sequence of 3D maps, a pressure applied by one or more fingers of the hand against the physical surface, and incorporating the pressure into the simulated input wherein simulating the input comprises drawing a line in response to movement of the one or more fingers, while controlling a thickness of the drawn line responsively to the pressure.

12. A method, comprising:

receiving, by a computer, a two-dimensional color image (2D containing at least a physical surface;

segmenting the physical surface into one or more physical regions;

assigning a functionality to each of the one or more physical regions, each of the functionalities corresponding to a tactile input device;

receiving a sequence of three-dimensional (3D) maps containing at least an object held by a hand of a user of the computer the object positioned on one of the physical regions;

recognizing, in the 2D color image, a color of the object held by the hand;

analyzing the 3D maps to detect a gesture performed using the object; and simulating, based on the gesture, an input for the tactile input device corresponding to the one of the physical regions while incorporating the recognized color of the object into the simulated input wherein simulating the input comprises projecting an image that incorporates the recognized color onto the physical surface.

* * * * *